US012580120B2

(12) United States Patent
Sohn et al.

(10) Patent No.: US 12,580,120 B2
(45) Date of Patent: Mar. 17, 2026

(54) TRANSFORMER AND FLAT PANEL DISPLAY DEVICE COMPRISING SAME

(71) Applicant: LG INNOTEK CO., LTD., Seoul (KR)

(72) Inventors: In Seong Sohn, Seoul (KR); Seok Bae, Seoul (KR); Taek Hoon Nam, Seoul (KR); Jung Eun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 673 days.

(21) Appl. No.: 18/009,036

(22) PCT Filed: Jul. 15, 2021

(86) PCT No.: PCT/KR2021/009100
§ 371 (c)(1),
(2) Date: Dec. 8, 2022

(87) PCT Pub. No.: WO2022/015073
PCT Pub. Date: Jan. 20, 2022

(65) Prior Publication Data

US 2023/0282410 A1 Sep. 7, 2023

(30) Foreign Application Priority Data

Jul. 17, 2020 (KR) ........................ 10-2020-0088614
Jul. 17, 2020 (KR) ........................ 10-2020-0088615
(Continued)

(51) Int. Cl.
*H01F 27/30* (2006.01)
*H01F 27/02* (2006.01)
*H01F 27/32* (2006.01)

(52) U.S. Cl.
CPC .......... *H01F 27/306* (2013.01); *H01F 27/02* (2013.01); *H01F 27/325* (2013.01)

(58) Field of Classification Search
CPC ..................................................... H01F 27/306
(Continued)

(56) References Cited

U.S. PATENT DOCUMENTS 6,344,786 B1 2/2002 Chin
8,643,459 B2 * 2/2014 Eom ...................... H01F 27/29
336/208
(Continued)

FOREIGN PATENT DOCUMENTS

CN 107301915 B 10/2019
JP 2000-100639 A 4/2000
(Continued)

OTHER PUBLICATIONS

Supplemental European Search Report dated Jan. 8, 2024 in European Application No. 21841465.4.
(Continued)

*Primary Examiner* — Ronald Hinson
(74) *Attorney, Agent, or Firm* — Saliwanchik, Lloyd & Eisenschenk

(57) ABSTRACT

A transformer according to one embodiment of the present invention comprises: a core unit including an upper core and a lower core; a coil unit of which a portion is disposed in the core unit; and a bobbin unit disposed between the core unit and the coil unit, wherein the coil unit includes a first coil and a second coil of which at least a portion is disposed on the side surface of the first coil, the core unit includes a first outer foot part, a second outer foot part, and an intermediate foot part disposed between the first outer foot part and the second outer foot part, and the shortest distance between the first coil and the second coil can be 0.1 to 0.3 times the shortest distance between the outermost part of the first coil and an adjacent outer foot part from among the first outer foot part and the second outer foot part.

18 Claims, 17 Drawing Sheets

(30) Foreign Application Priority Data

Jul. 22, 2020 (KR) ........................ 10-2020-0090828
Jul. 14, 2021 (KR) ........................ 10-2021-0092305
Jul. 14, 2021 (KR) ........................ 10-2021-0092310

(58) Field of Classification Search
USPC ................................ 336/185, 198, 200, 208
See application file for complete search history.

(56) References Cited

U.S. PATENT DOCUMENTS 8,779,883 B2* 7/2014 Kobayashi ............ H01F 27/027 336/212
2006/0214759 A1* 9/2006 Kawarai ............. H01F 17/0006 336/200
2012/0001714 A1* 1/2012 Shin ...................... H01F 27/325 336/198
2012/0001887 A1 1/2012 Park et al.
2012/0002387 A1* 1/2012 Park ....................... H05B 41/02 361/679.01
2013/0141204 A1* 6/2013 Maeda ...................... H01F 3/00 336/192
2013/0154787 A1* 6/2013 Maeda .................. H01F 27/326 336/220
2013/0328654 A1* 12/2013 Iwakura ................ H01F 27/006 336/196
2014/0139313 A1* 5/2014 Zhou ...................... B65H 75/14 335/297
2015/0357111 A1* 12/2015 Sasaki ....................... H01F 5/04 29/605
2015/0364245 A1* 12/2015 Jang .................... H01F 27/2804 336/208
2016/0111206 A1* 4/2016 Takeuchi ............ H01F 27/2866 336/198
2018/0047501 A1* 2/2018 Lee ..................... H01F 27/2866

FOREIGN PATENT DOCUMENTS

JP 2010-153476 A 7/2010
JP 2013-016737 1/2013
JP 2014-209652 A 11/2014
JP 2014-216373 A 11/2014
JP 2016-032069 3/2016
JP 2016-207811 A 12/2016
JP 2017-143221 A 8/2017
KR 10-1032231 5/2011
KR 10-2012-0030930 3/2012
KR 10-2015-0040528 4/2015
KR 10-2015-0045694 4/2015
KR 10-1686975 1/2017

OTHER PUBLICATIONS

Office Action dated Apr. 22, 2025 in Japanese Application No. 2022-577668.

Office Action dated Mar. 17, 2023 in Korean Application No. 10-2023-0029134.

International Search Report dated Nov. 2, 2021 issued in Application No. PCT/KR2021/009100.

* cited by examiner

TRANSFORMER AND FLAT PANEL DISPLAY DEVICE COMPRISING SAME

CROSS-REFERENCE TO RELATED PATENT APPLICATIONS

This application is a U.S. National Stage Application under 35 U.S.C. § 371 of PCT Application No. PCT/KR2021/009100, filed Jul. 15, 2021, which claims priority to Korean Patent Application Nos. 10-2020-0088614, filed Jul. 17, 2020, 10-2020-0088615, filed Jul. 17, 2020, 10-2020-0090828, filed Jul. 22, 2020, 10-2021-0092310, filed Jul. 14, 2021 and 10-2021-0092305, filed Jul. 14, 2021, whose entire disclosures are hereby incorporated by reference.

TECHNICAL FIELD

The present disclosure relates to a transformer and a flat panel display device including the same.

BACKGROUND ART

In general, driving power is required in order to drive an electronic device, and a power supply device, such as a power supply unit (PSU), is essentially used in order to supply driving power to the electronic device.

In particular, a display device, such as a flat panel TV, is required to be slim, and is continually being embodied in increasingly large sizes. Accordingly, it is necessary to reduce the thickness of such a large-scale display while meeting the increased power requirements thereof.

A transformer occupies a larger volume in the power supply unit (PSU) than other elements. In order to realize a slim-type transformer, a method of omitting thick elements from the transformer or adjusting the number thereof is generally considered. For example, in recent years, a bobbin, around which a primary coil and a secondary coil are wound so as to be secured thereto, has been omitted from a transformer constituting a power supply unit of a flat panel display device, or a plurality of low-capacity slim-type transformers has been adopted.

In such a PSU, leakage inductance within a specific range (e.g. 50 μH or greater) is required for design of a resonant tank of a circuit and frequency matching. However, because a general slim-type transformer is structured such that a primary coil and a secondary coil are stacked in the vertical direction, both the primary coil and the secondary coil stacked in the vertical direction have an influence on the thickness of the transformer. Therefore, there is a limitation with regard to reduction in the thickness of the transformer, and leakage inductance decreases greatly (e.g. about 3 μH). It is necessary to secure leakage inductance above a predetermined level in order to implement a switching mode operation in the circuit.

Therefore, there is a demand for a transformer capable of being further slimmed and securing sufficient leakage inductance and a flat panel display device using the same.

DISCLOSURE

Technical Problem

A technical task of the present disclosure is to provide a slim-type transformer capable of being further slimmed and securing sufficient leakage inductance and a flat panel display device using the same.

In addition, the present disclosure provides a slim-type transformer exhibiting excellent heat dissipation performance with a slim structure and a flat panel display device using the same.

The technical tasks of the present disclosure are not limited to the above-mentioned technical tasks, and other technical tasks not mentioned herein will be clearly understood by those skilled in the art from the following description.

Technical Solution

A transformer according to an embodiment may include a core unit including an upper core and a lower core, a coil unit partially disposed in the core unit, and a bobbin unit disposed between the core unit and the coil unit. The coil unit may include a first coil and a second coil, which is at least partially disposed beside the first coil. The bobbin unit may include a first bobbin having a first receiving portion formed therein to receive the first coil and a second bobbin having a second receiving portion formed therein to receive the second coil. The first bobbin may include a first extension portion extending from the first receiving portion toward the second bobbin, and the second receiving portion may be disposed on the first extension portion.

In an example, the shortest distance between the lower surface of the lower core and the first coil and the shortest distance between the lower surface of the lower core and the second coil may be different from each other.

In an example, a first space formed between the first outer leg portion and the center leg portion to receive a portion of the bobbin unit and a second space formed between the second outer leg portion and the center leg portion to receive the other portion of the bobbin unit may be included.

In an example, the first coil and the second coil may at least partially overlap each other in a first direction, which is a direction from the first outer leg portion toward the second outer leg portion.

In an example, the shortest distance between the first coil and the second coil may be 0.1 times to 0.3 times as long as the shortest distance from the outermost periphery of the first coil to one outer leg portion adjacent thereto, among the first outer leg portion and the second outer leg portion.

In an example, a ratio of a second distance, which is the shortest distance between the first coil and the second coil in the first space or the second space, to a first distance, which is the shortest distance between the first coil and the second coil outside the first space and the second space, may be 1 to 1.3.

In an example, the shortest distance between the lower surface of the lower core and the first coil may be 0.3 to 0.7 times as long as the shortest distance between the lower surface of the lower core and the second coil.

In an example, the transformer may further include insulating units respectively disposed between the first outer leg portion and the bobbin unit in the first space and between the second outer leg portion and the bobbin unit in the second space.

In an example, the first bobbin may further include a coil lead-out portion disposed on the upper surface thereof, and the second bobbin may have formed therein a through-hole, through which the coil lead-out portion passes and is exposed.

In an example, the first bobbin may include a first top portion, a first bottom portion disposed below the top portion, and a first middle portion disposed between the top portion and the bottom portion. The first extension portion may be disposed on the bottom portion.

In an example, the second bobbin may include a second top portion, a second bottom portion disposed below the top portion, and a second middle portion disposed between the second top portion and the second bottom portion. The first bobbin may be at least partially received in a recess defined by the lower surface of the second top portion and the inner side surface of the second middle portion.

In an example, the first extension portion may face the lower surface of the second bottom portion.

In addition, a transformer according to an embodiment may include a core unit including an upper core and a lower core, a coil unit partially disposed in the core unit, and a bobbin unit disposed between the core unit and the coil unit. The coil unit may include a first coil and a second coil, which is at least partially disposed beside the first coil. The core unit may include a first outer leg portion, a second outer leg portion, and a center leg portion disposed between the first outer leg portion and the second outer leg portion. The shortest distance between the first coil and the second coil may be 0.1 times to 0.3 times as long as the shortest distance from the outermost periphery of the first coil to one outer leg portion adjacent thereto, among the first outer leg portion and the second outer leg portion.

In an example, the bobbin unit may include a first bobbin having a first receiving portion formed therein to receive the first coil and a second bobbin having a second receiving portion formed therein to receive the second coil. The first bobbin may include a first extension portion extending from the first receiving portion toward the second bobbin, and the second receiving portion may be disposed on the first extension portion.

In an example, the shortest distance between the lower surface of the lower core and the first coil and the shortest distance between the lower surface of the lower core and the second coil may be different from each other.

In an example, the shortest distance between the lower surface of the lower core and the first coil may be shorter than the shortest distance between the lower surface of the lower core and the second coil.

In an example, the second bobbin may include a second extension portion extending from the second receiving portion toward the first bobbin, and the first receiving portion may be disposed under the second extension portion.

In an example, a part of the second receiving portion may be disposed between the first coil and the second coil.

In an example, the core unit may further include a first space formed between the first outer leg portion and the center leg portion to receive a portion of the bobbin unit and a second space formed between the second outer leg portion and the center leg portion to receive the other portion of the bobbin unit.

In an example, the first coil and the second coil may at least partially overlap each other in a first direction, which is a direction from the first outer leg portion toward the second outer leg portion.

In an example, a ratio of a second distance, which is the shortest distance between the first coil and the second coil in the first space or the second space, to a first distance, which is the shortest distance between the first coil and the second coil outside the first space and the second space, may be 1 to 1.3.

In an example, the shortest distance between the lower surface of the lower core and the first coil may be 0.3 to 0.7 times as long as the shortest distance between the lower surface of the lower core and the second coil.

In an example, the transformer may further include insulating units respectively disposed between the first outer leg portion and the bobbin unit in the first space and between the second outer leg portion and the bobbin unit in the second space.

In an example, the first bobbin may further include a coil lead-out portion disposed on the upper surface thereof, and the second bobbin may have formed therein a through-hole, through which the coil lead-out portion passes and is exposed.

In an example, the first bobbin may include a first top portion, a first bottom portion disposed below the top portion, and a first middle portion disposed between the top portion and the bottom portion. The first extension portion may be disposed on the bottom portion.

In an example, the second bobbin may include a second top portion, a second bottom portion disposed below the top portion, and a second middle portion disposed between the second top portion and the second bottom portion. The first bobbin may be at least partially received in a recess defined by the lower surface of the second top portion and the inner side surface of the second middle portion.

In an example, the first extension portion may face the lower surface of the second bottom portion.

In addition, a flat panel display device according to an embodiment may include a power supply unit in which a transformer is disposed. The transformer may include a core unit including an upper core and a lower core, a coil unit partially disposed in the core unit, and a bobbin unit disposed between the core unit and the coil unit. The coil unit may include a first coil and a second coil, which is at least partially disposed beside the first coil. The core unit may include a first outer leg portion, a second outer leg portion, and a center leg portion disposed between the first outer leg portion and the second outer leg portion. The shortest distance between the first coil and the second coil may be 0.1 times to 0.3 times as long as the shortest distance from the outermost periphery of the first coil to one outer leg portion adjacent thereto, among the first outer leg portion and the second outer leg portion.

In addition, a transformer according to another embodiment may include a core unit including an upper core and a lower core, a coil unit partially disposed in the core unit, a bobbin unit disposed between the core unit and the coil unit, and a plurality of coil-fixing units disposed so as to surround at least part of the upper portion and at least part of the outer side portion of the coil unit to fix the coil unit to the bobbin unit and to electrically isolate the coil unit from the core unit.

In an example, the coil unit may include a first coil and a second coil disposed beside the first coil. The core unit may include a first outer leg portion and a second outer leg portion, which extend in first direction in plane and are spaced apart from each other in a second direction intersecting the first direction, and a center leg portion disposed between the first outer leg portion and the second outer leg portion.

In an example, the bobbin unit may include a first bobbin, which includes a first plate supporting the first coil upwards and a first side wall disposed on the upper surface of the first plate to allow the first coil to be wound on the outer circumferential surface thereof, and a second bobbin, which includes a second plate supporting the second coil upwards and a second side wall disposed on the upper surface of the second plate to allow the second coil to be wound on the outer circumferential surface thereof. The first bobbin may be disposed in a through-hole defined by the inner circumferential surface of the second side wall.

In an example, at least part of the plurality of coil-fixing units may be disposed on parts of the upper portion and the outer side portion of the coil unit that overlap the core unit in the vertical direction.

In an example, the at least part of the plurality of coil-fixing units may include a 1-1$^{st}$ coil-fixing unit, which extends in the first direction and is disposed so as to surround the upper side and the outer side surface of the first coil in a first receiving space disposed between the first outer leg portion and the center leg portion of the core unit, a 2-1$^{st}$ coil-fixing unit, which extends in the first direction and is disposed so as to surround the upper side and the outer side surface of the second coil in the first receiving space, a 1-2$^{nd}$ coil-fixing unit, which extends in the first direction and is disposed so as to surround the upper side and the outer side surface of the first coil in a second receiving space disposed between the second outer leg portion and the center leg portion of the core unit, and a 2-2$^{nd}$ coil-fixing unit, which extends in the first direction and is disposed so as to surround the upper side and the outer side surface of the second coil in the second receiving space.

In an example, the at least part of the plurality of coil-fixing units may include a third coil-fixing unit, which extends in the first direction and is disposed so as to surround the upper side of the first coil and the upper side and the outer side surface of the second coil in a first receiving space disposed between the first outer leg portion and the center leg portion of the core unit, and a fourth coil-fixing unit, which extends in the first direction and is disposed so as to surround the upper side of the first coil and the upper side and the outer side surface of the second coil in a second receiving space disposed between the second outer leg portion and the center leg portion of the core unit.

In an example, the at least part of the plurality of coil-fixing units may further extend from opposite ends of the core unit by 1 to 10 mm in the first direction.

In an example, each of the plurality of coil-fixing units may include a sheet of flexible insulating tape, and the sheet of insulating tape may include Kapton, ketone, or polyimide.

In an example, the height of the bobbin unit may be 100% to 140% of the height of the coil unit.

In an example, the thickness of each of the plurality of coil-fixing units may be 90% or less of the thickness of the first plate or the second plate.

In addition, a flat panel display device according to another embodiment may include a power supply unit in which a transformer is disposed. The transformer may include a core unit including an upper core and a lower core, a coil unit partially disposed in the core unit, a bobbin unit disposed between the core unit and the coil unit, and a plurality of coil-fixing units disposed so as to surround at least part of the upper portion and at least part of the outer side portion of the coil unit to fix the coil unit to the bobbin unit and to electrically isolate the coil unit from the core unit.

Advantageous Effects

In a transformer according to an embodiment and a flat panel display device including the same, leakage inductance is secured by controlling the spacing distance between a primary coil and a secondary coil.

In addition, an insulation distance is secured between the primary coil and a core due to the coupling structure of a first bobbin and a second bobbin, whereby sufficient leakage inductance is secured.

In addition, in a transformer according to another embodiment and a flat panel display device including the same, an upper portion of a bobbin unit is substituted with a thin-film-type coil-fixing unit, and thus the transformer may be slimmed compared to a transformer including a general bobbin having an upper plate.

In addition, heat is smoothly dissipated through a portion of the bobbin unit on which the coil-fixing unit is not disposed. Furthermore, although the coil-fixing unit is disposed on a portion of the bobbin unit, this is advantageous from the aspect of heat dissipation compared to a general bobbin having an upper plate.

The effects achievable through the present disclosure are not limited to the above-mentioned effects, and other effects not mentioned herein will be clearly understood by those skilled in the art from the following description.

BEST MODE

Figure 1A:
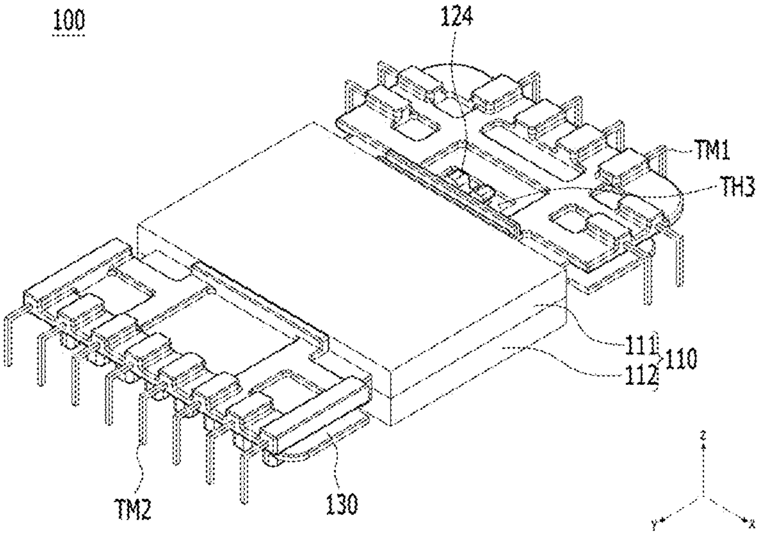
FIG. 1A is a perspective view of a transformer according to an embodiment.

The present disclosure will now be described more fully hereinafter with reference to the accompanying drawings, in which various embodiments are shown. The examples, however, may be embodied in many different forms and should not be construed as being limited to the embodiments set forth herein. It is to be understood that the present disclosure covers all modifications, equivalents, and alternatives falling within the scope and spirit of the present disclosure.

While ordinal numbers including "second", "first", etc. may be used to describe various components, they are not intended to limit the components. These expressions are used only to distinguish one component from another component. For example, a second element could be termed a first element, and, similarly, a first element could be termed a second element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

In the description of the embodiments, it will be understood that when an element, such as a layer (film), a region, a pattern or a structure, is referred to as being "on" or "under" another element, such as a substrate, a layer (film), a region, a pad or a pattern, the term "on" or "under" means that the element is "directly" on or under another element or is "indirectly" formed such that an intervening element may also be present. It will also be understood that criteria of on or under is on the basis of the drawing. In addition, the thickness or size of a layer (film), a region, a pattern or a structure shown in the drawings may be exaggerated, omitted or schematically drawn for the clarity and convenience of explanation, and may not accurately reflect the actual size.

The terminology used herein is for the purpose of describing particular embodiments only and is not intended to be limiting of exemplary embodiments of the disclosure. As used herein, the singular forms are intended to include the plural forms as well, unless the context clearly indicates otherwise. It will be further understood that the term "include" or "have", when used herein, specifies the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, embodiments will be described in detail with reference to the accompanying drawings, and the same or equivalent elements are denoted by the same reference numerals even when they are depicted in different drawings, and redundant descriptions thereof will be omitted. In addition, the embodiments will be described using the Cartesian coordinate system, but can also be described using other coordinate systems. In the Cartesian coordinate system, the x-axis, the y-axis, and the z-axis shown in each drawing are perpendicular to each other, but the embodiments are not limited thereto. The x-axis, the y-axis, and the z-axis may intersect each other obliquely.

In addition, considering that a transformer related to the embodiments is mounted in a display device, the thickness (or the vertical height) of the transformer for contributing to slimness of the display device may be 14 mm or less, preferably 12 mm or less, and more preferably 10 mm or less.

Hereinafter, a transformer according to an embodiment will be described in detail with reference to the accompanying drawings.

Figure 1B:
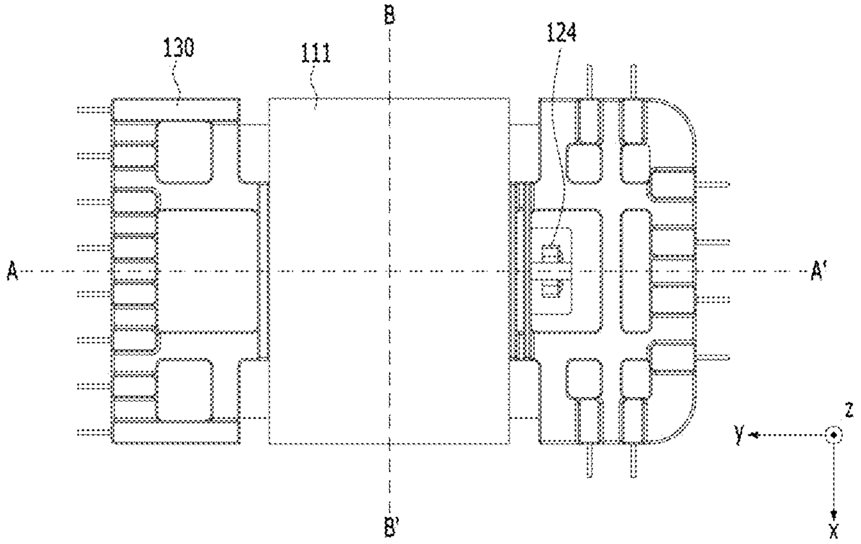
FIG. 1B is a plan view of the transformer according to the embodiment.
Figure 2:
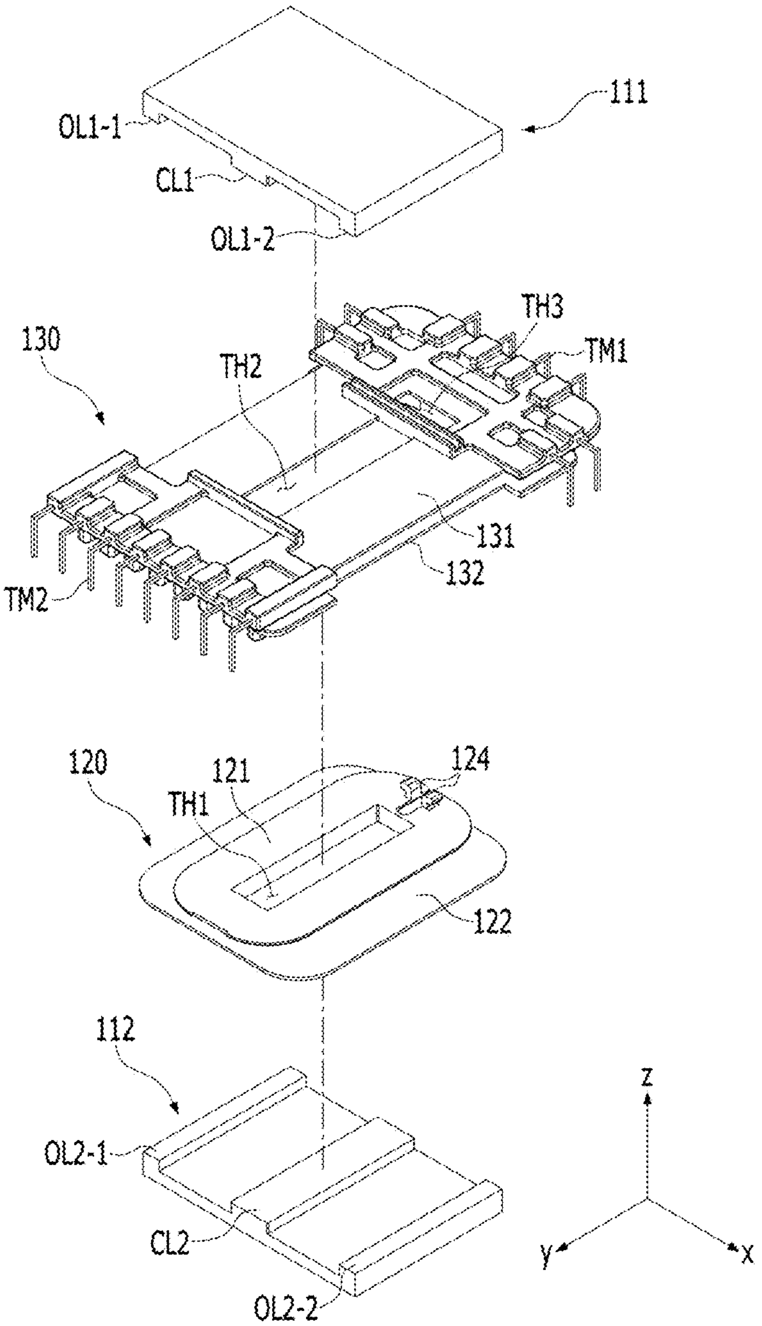
FIG. 2 is an exploded perspective view of the transformer according to the embodiment.
Figure 3:
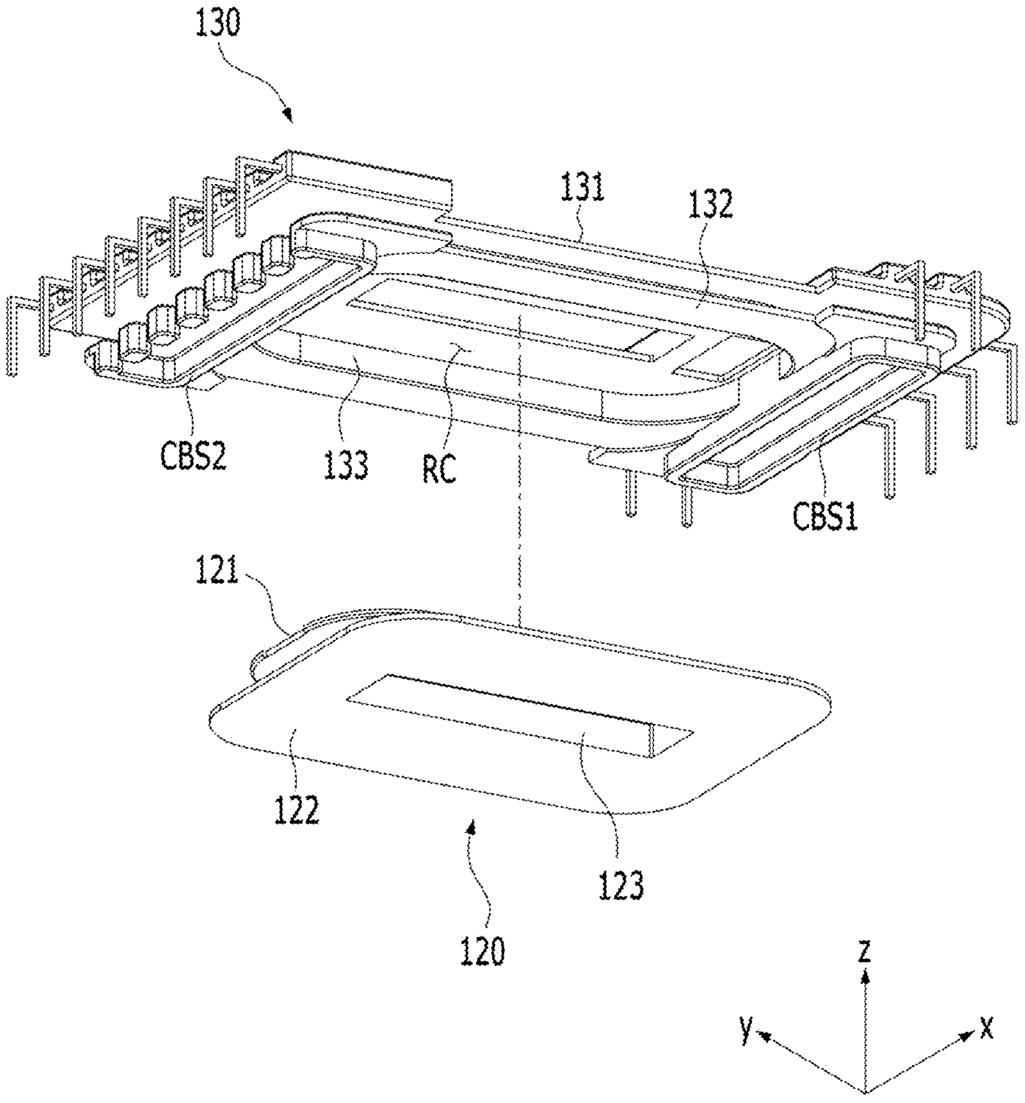
FIG. 3 is an exploded perspective view of a bobbin unit according to an embodiment.

FIG. 1A is a perspective view of a transformer according to an embodiment, and FIG. 1B is a plan view of the transformer according to the embodiment. In addition, FIG. 2 is an exploded perspective view of the transformer according to the embodiment. In addition, FIG. 3 is an exploded perspective view of bobbin units according to an embodiment.

Referring to FIGS. 1A to 3 together, a transformer 100 according to an embodiment may include a core unit 110, bobbin units 120 and 130, and terminal units TM1 and TM2. Hereinafter, the respective components will be described in detail.

The core unit 111 and 112 may have the function of a magnetic circuit, and may serve as a path for magnetic flux. The core unit 111 and 112 may include an upper core 111, which is disposed at an upper position, and a lower core 112, which is disposed at a lower position. The two cores 111 and 112 may be formed to be symmetrical or asymmetrical with each other in the vertical direction. However, for convenience of explanation, the following description will be made on the assumption that the two cores are formed to be vertically symmetrical with each other.

Each of the upper core 111 and the lower core 112 may include a body portion, which has a flat plate shape, and a plurality of leg portions OL1-1, OL1-2, OL2-1, OL2-2, CL1, and CL2, which protrude from the body portion in the thickness direction (i.e. the Z-axis direction) and extend in a predetermined direction. For example, the plurality of leg portions OL1-1, OL1-2, and CL1 of the upper core 111 may include two outer legs OL1-1 and OL1-2, which extend in one axial direction (here, the Y-axis direction) and are spaced apart from each other in another axial direction (here, the X-axis direction) on a flat surface, and one center leg CL1, which is disposed between the two outer legs OL1-1 and OL1-2.

When the upper core 111 and the lower core 112 are coupled to each other in the vertical direction, each of the outer legs OL1-1 and OL1-2 and the center leg CL1 of the upper core 111 faces a corresponding one of the outer legs OL2-1 and OL2-2 and the center leg CL2 of the lower core 112. One pair of outer legs OL1-1 and OL2-1, which face each other, may be referred to as "first outer leg portions", the other pair of outer legs OL1-2 and OL2-2, which face each other, may be referred to as "second outer leg portions", and the pair of center legs CL1 and CL2 may be referred to as "center leg portions".

A gap having a predetermined distance (e.g. 10 to 200 μm, without being limited thereto) may be formed between at least one pair among the pairs of outer legs and the pair of center legs, which face each other. The sizes of the gaps between the one pair of center legs and between each of the two pairs of outer legs may be adjusted in order to control the inductance of the core unit 110, and the amount of heat that is generated may be controlled by varying the number of gaps.

In addition, the core unit 110 may include a magnetic material, for example, iron or ferrite, but the disclosure is not limited thereto.

Because the core unit 110 surrounds a portion of the outer periphery of each of the bobbin units 120 and 130, it can be seen that a portion of a primary coil (not shown) and a portion of a secondary coil (not shown), which are received in the bobbin units 120 and 130, are disposed inside the core unit 110.

The bobbin units 120 and 130 may include a first bobbin 120 and a second bobbin 130.

The first bobbin 120 and the second bobbin 130 may respectively have a first through-hole TH1 and a second through-hole TH2 formed therein, and the center legs CL1 and CL2 of the core unit 110 may be aligned so as to pass through the first through-hole TH1 and the second through-hole TH2.

At least a portion of the first bobbin 120 may be received in the second bobbin 130, and may include a first top portion 121, a first middle portion 123, and a first bottom portion 122.

Each of the first top portion 121 and the first bottom portion 122 may take the form of a quadrangular-shaped flat plate having rounded corners, but the disclosure is not limited thereto. In addition, the first bottom portion 122 may have the shape of a flat plate that extends further outwards than the first top portion 121 in the direction in which the leg portions are spaced apart from each other (i.e. the X-axis direction).

The first middle portion 123 may be disposed between the first top portion 121 and the first bottom portion 122 so as to be oriented in the vertical direction, and may electrically isolate the center leg portions from a conductive wire (not shown) constituting the primary coil. The space defined by the lower surface of the first top portion 121, the outer side surface of the first middle portion 122, and a portion of the upper surface of the first bottom portion may function as a receiving space for receiving the conductive wire constituting the primary coil.

The second bobbin 130 may include a second top portion 131, a second middle portion 133, a second bottom portion 132, and board support portions CBS1 and CBS2.

The second middle portion 133 may be disposed between the second top portion 131 and the second bottom portion 132 so as to be oriented in the vertical direction, and may electrically isolate a conductive wire (not shown) constituting the secondary coil from the conductive wire (not shown) constituting the primary coil. The space defined by a portion of the lower surface of the second top portion 131, the outer side surface of the second middle portion 132, and a portion of the upper surface of the second bottom portion may function as a receiving space for receiving the conductive wire constituting the secondary coil.

In addition, the board support portions CBS1 and CBS2, which are spaced apart from each other in the long-axis direction of the second bottom portion 132, may function to support the transformer 100 when the transformer 100 is mounted on a circuit board (not shown) of a device such as a PSU.

Terminal units TM1 and TM2 may be disposed on respective ends of the second top portion 132 in the long-axis direction thereof. The terminal units TM1 and TM2 may function to fix the transformer 100 to the board (not shown) of the power supply unit (PSU), and may function as paths for conductive connection between the primary and secondary coils (not shown) of the transformer 100 and the board (not shown) of the power supply unit (PSU).

In more detail, the first terminal unit TM1 may include a plurality of pins, which are spaced apart from each other, and any one of the two ends of the conductive wire constituting the primary coil may be conductively connected to at least one of the plurality of pins. The second terminal unit TM2 may include a plurality of pins, which are spaced apart from each other, and any one of the two ends of the conductive wire constituting the secondary coil may be conductively connected to at least one of the plurality of pins.

When the transformer 100 is constructed, at least a portion of the first bobbin 120 may be received in a recess RC defined by the lower surface of the second top portion 131 and the inner side surface of the second middle portion 133 of the second bobbin 130. In addition, in the state in which the first bobbin 120 and the second bobbin 130 are coupled to each other, the upper surface of the first top portion 121 faces the lower surface of the second top portion 131, and the portion of the upper surface of the first bottom portion 122 that does not overlap the first top portion 121 in the vertical direction (i.e. the portion extending outwards) faces the lower surface of the second bottom portion 132. In addition, in the coupled state, a coil lead-out portion 124 of the first top portion 121 may be passed through a third through-hole TH3 in the second top portion 131, and may be exposed upwards. By virtue of the coil lead-out portion 124, the two ends of the conductive wire constituting the primary coil may be easily led out and secured to the upper surface of the second top portion 131, and may be directly connected to the first terminal unit TM1.

The state in which the primary coil and the secondary coil are received in the bobbin units 120 and 130 coupled as described above will be described with reference to FIGS. 4 to 5B.

Figure 4A:
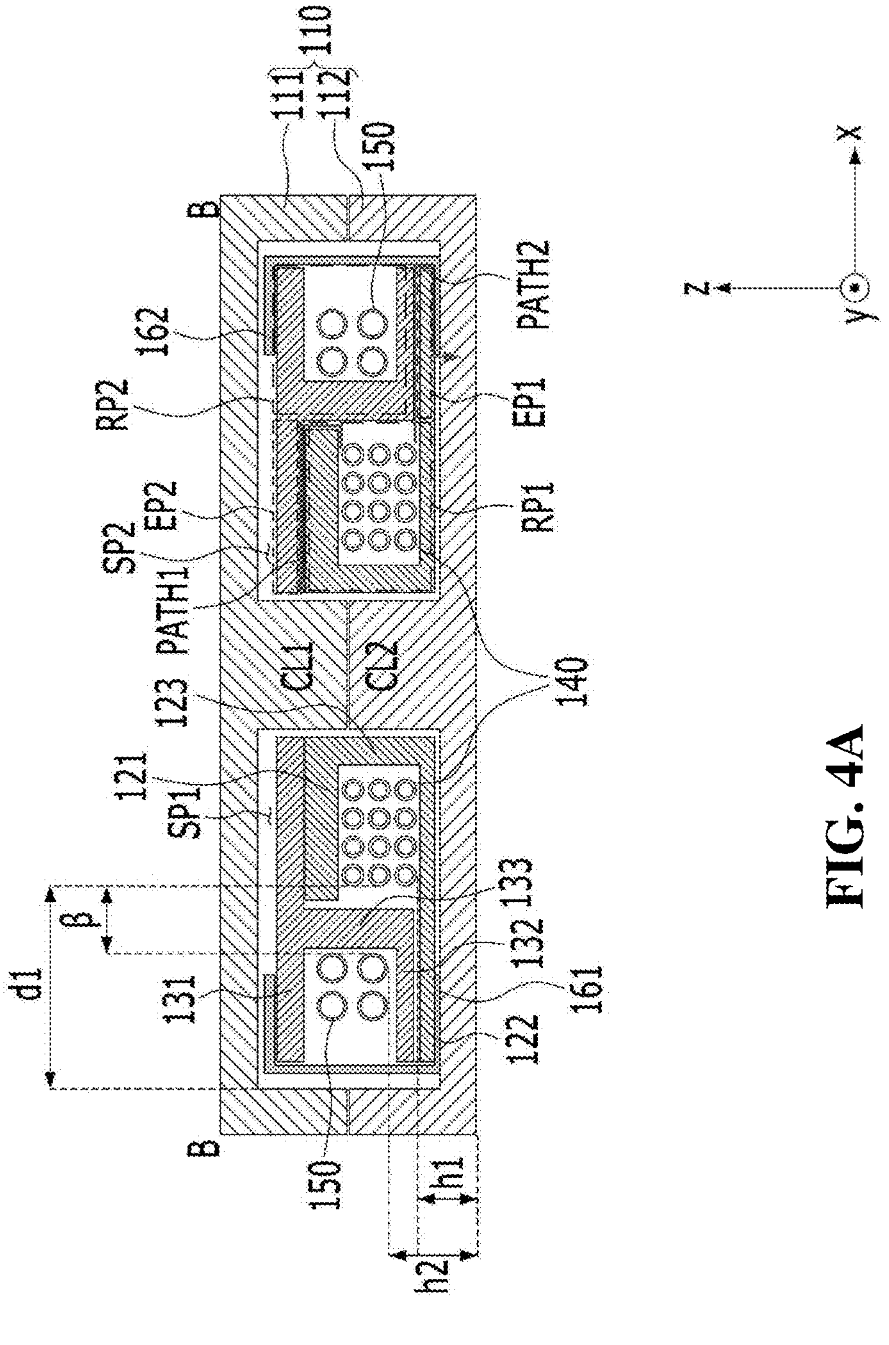
FIG. 4A is a cross-sectional view of the transformer according to the embodiment, taken along line B-B' in FIG. 1B.
Figure 4B:
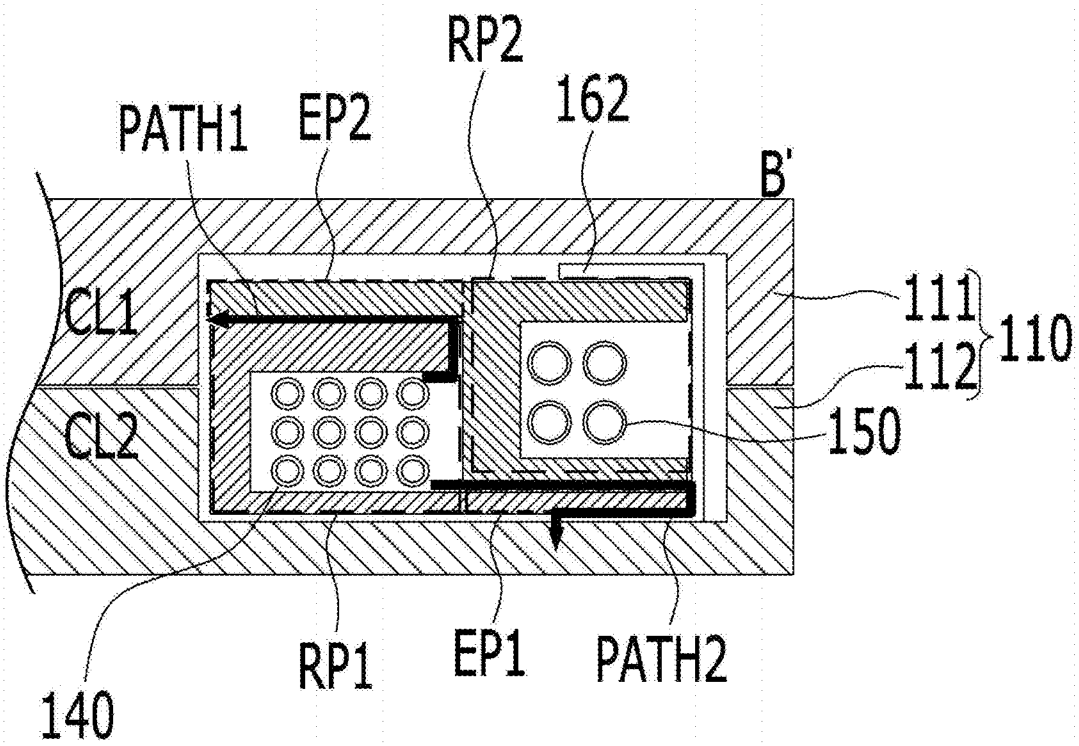
FIG. 4B illustrates the insulation distance of the primary coil to the core unit.

FIG. 44 is a cross-sectional view of the transformer according to the embodiment, taken along line B-B' in FIG. 1B, and FIG. 4B illustrates the insulation distance of the primary col to the core unit.

Referring to FIGS. 4A and 4B, the bobbin units 120 and 130 are disposed between the core unit 110 and coil units 140 and 150.

In more detail, the coil units 140 and 150 and the bobbin units 120 and 130 are partially disposed in a first space SP1 and a second space SP2 in the core unit 110. The first space SP1 and the second space SP2 may be spaced apart from each other in the direction in which the leg portions are spaced apart from each other, with the center legs CL1 and CL2 interposed therebetween (i.e. the X-axis direction), and each thereof may have a quadrangular-shaped section that extends in the Y-axis direction. In addition, the first space SP1 may be located between the center leg portions CL1 and CL2 and the first outer leg portions OL1-1 and OL2-1 of the core unit 110, and the second space SP2 may be located between the center leg portions CL1 and CL2 and the second outer leg portions OL1-2 and OL2-2.

The first bobbin 120 may include a first receiving portion RP1 receiving the primary coil 140 therein and a first extension portion EP1 extending from the first receiving portion RP1 toward the second bobbin 130. That is, the first receiving portion RP1 may be a portion defined by the first top portion 121, the first middle portion 123, and a portion of the first bottom portion 122 other than the first extension portion EP1.

The second bobbin 130 may include a second receiving portion RP2 receiving the secondary coil 150 therein and a second extension portion EP2 extending from the second receiving portion RP2 toward the first bobbin 120. That is, the second receiving portion RP2 may include a portion of the second top portion 131 other than the second extension portion EP2, the second middle portion 133, and the second bottom portion 132.

In addition, the second receiving portion RP2 is disposed on the first extension portion EP1, and the first receiving portion RP1 is disposed under the second extension portion EP2. Accordingly, the shortest distance h1 from the lower surface of the lower core 112 to the primary coil 140 is different from the shortest distance h2 from the lower surface of the lower core 112 to the secondary coil 150. That is, the shortest distance h1 from the lower surface of the lower core 112 to the primary coil 140 is shorter than the shortest distance h2 from the lower surface of the lower core 112 to the secondary coil 150. For example, the shortest distance h1 from the lower surface of the lower core 112 to the primary coil 140 is 0.3 times to 0.7 times as long as the shortest distance h2 from the lower surface of the lower core 112 to the secondary coil 150.

In addition, due to the above-described coupling structure of the bobbin units 120 and 130, a portion of the primary coil 140 and a portion of the secondary coil 150 overlap each other in the direction from the first outer leg portions toward the second outer leg portion, and the remaining portions thereof do not overlap each other. The primary coil 140 and the secondary coil 150 may not overlap each other in the vertical direction.

At least a portion of the secondary coil 150 is disposed beside the primary coil 140, and a portion of the second receiving portion RP2, i.e. the second middle portion 133, is disposed between the primary coil 140 and the secondary coil 150 in the horizontal direction.

Each of the primary coil 140 and the secondary coil 150 may be a multiple-turn winding in which a rigid metallic conductor, for example a copper conductive wire, is wound multiple times, but the disclosure is not limited thereto. In addition, the thickness of the conductive wire constituting the secondary coil 150 may be 50% to 150% of the thickness of the conductive wire constituting the primary coil 140, but the disclosure is not limited thereto.

Meanwhile, insulating units 161 and 162 may be disposed between the bobbin units 120 and 130 and respective outer leg portions. The insulating units 161 and 162 may extend from a region on the upper surface of the second receiving portion RP2 to the outer side of the second receiving portion RP2, may then be bent and extend so as to surround the outer sides of the second receiving portion RP2 and the first extension portion EP1, and may then be bent and extend to a region on the lower surface of the first extension portion EP1. Accordingly, both the secondary coil 150 and the primary coil 140 may be electrically isolated from the outer leg portions of the core unit 110. The insulating units 161 and 162 may include a material having a superior insulating property, such as ketone or polyimide, but the disclosure is not limited thereto.

Due to the above-described structure, an insulation distance between the primary coil 140 and the core unit 110 may increase greatly. For example, if the second extension portion EP2 is not present, a first insulation distance PATH1, starting from the upper side of the primary coil 140, extends directly to the lower surface of the upper bobbin. However, due to the presence of the second extension portion EP2, the first insulation distance PATH1 extends a length equal to or longer than the length of the second extension portion in the x-axis direction. In addition, a second insulation distance PATH2, starting from the lower side of the primary coil 140, extends a length equal to the sum of the length of the first extension portion EP1 in the x-axis direction and the length of each of the insulating units 161 and 162 in the x-axis direction.

Furthermore, in addition to the leakage inductance obtained through the shortest distance β between the primary coil 140 and the secondary coil 150, separate leakage inductance may be further added thereto due to misalignment between the first receiving portion RP1 and the second receiving portion RP2 in the horizontal direction.

Hereinafter, parts of the transformer that are not enveloped by the core unit 110 will be described with reference to FIGS. 5A and 5B.

Figure 5A:
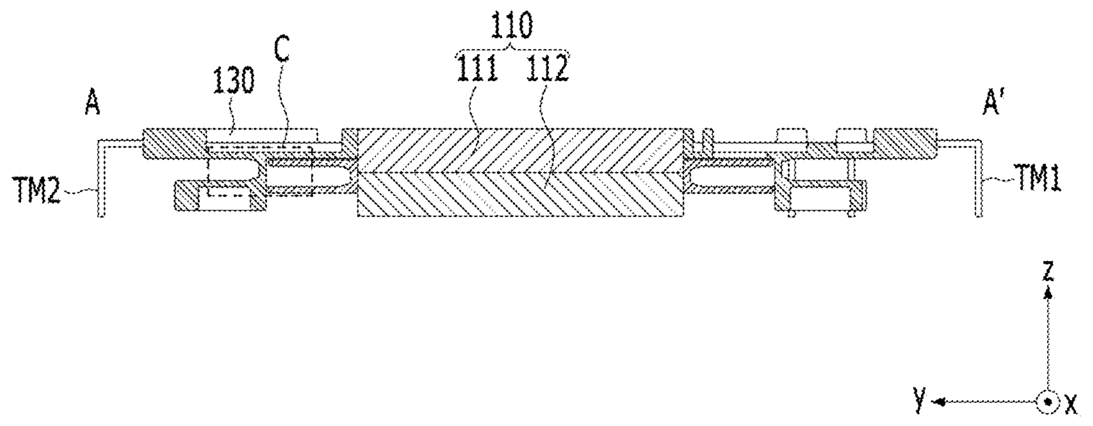
FIG. 5A is a cross-sectional view of the transformer according to the embodiment, taken along line A-A' in FIG. 1B.
Figure 5B:
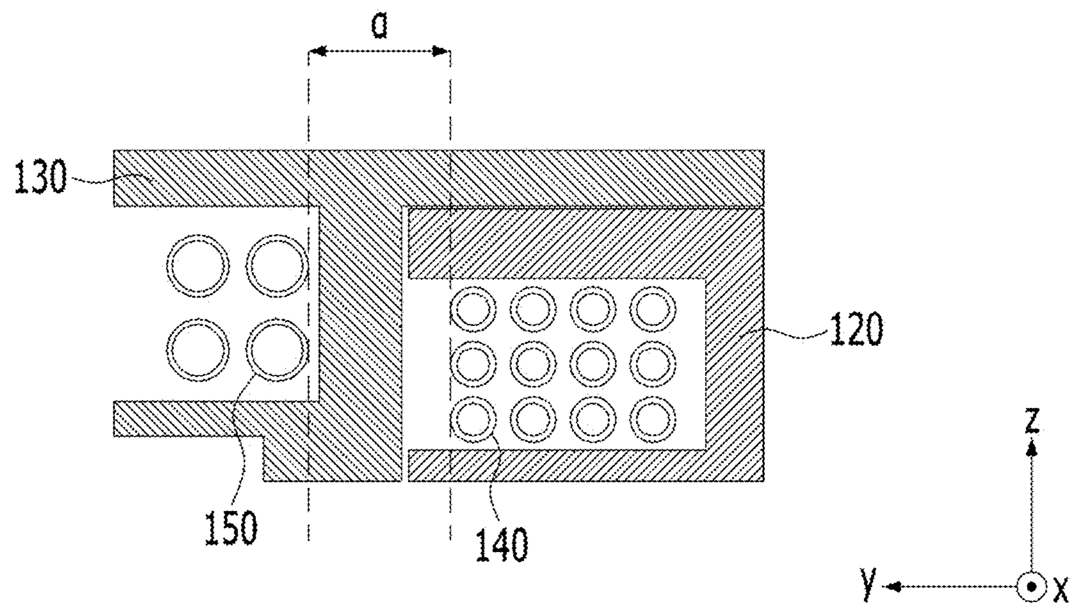
FIG. 5B is an enlarged view of portion C in FIG. 5A.

FIG. 5A is a cross-sectional view of the transformer according to the embodiment, taken along line A-A' in FIG. 1B, and FIG. 5B is an enlarged view of portion C in FIG. 5A.

Referring to FIGS. 5A and 5B together, in the region in which the bobbin units 120 and 130 are not enveloped by the core unit 110, the first extension portion EP1 may not be disposed in the first bobbin 120. Further, the shortest distance α between the primary coil 140 and the secondary coil 150 in the region in which the bobbin units 120 and 130 are not enveloped by the core unit 110, i.e. in the region outside the first space SP1 and the second space SP2, may be the same as or different from the shortest distance β between the primary coil 140 and the secondary coil 150 in the region in which the bobbin units 120 and 130 are enveloped by the core unit 110.

Preferably, a shortest-distance ratio (β/α) may be 1 to 1.3. When the shortest-distance ratio (β/α) is less than 1, the overall size of the transformer 100 is increased, and the change in leakage inductance is not large. On the other hand, when the shortest-distance ratio (β/a) exceeds 1.3, the energy conversion efficiency of the transformer 100 is reduced. However, the shortest-distance ratio (β/α) having the above range is a value determined when the cut line A-A' and the cut line B-B' in FIG. 1B intersect each other at the center of the center leg portion in a plane, and may vary depending on the radius of curvature of each of the first middle portion 123 and the second middle portion 133 in the winding direction.

Hereinafter, the transformer 100 according to the embodiment and the configuration of a circuit in which the transformer 100 can be mounted will be described with reference to FIG. 6.

Figure 6:
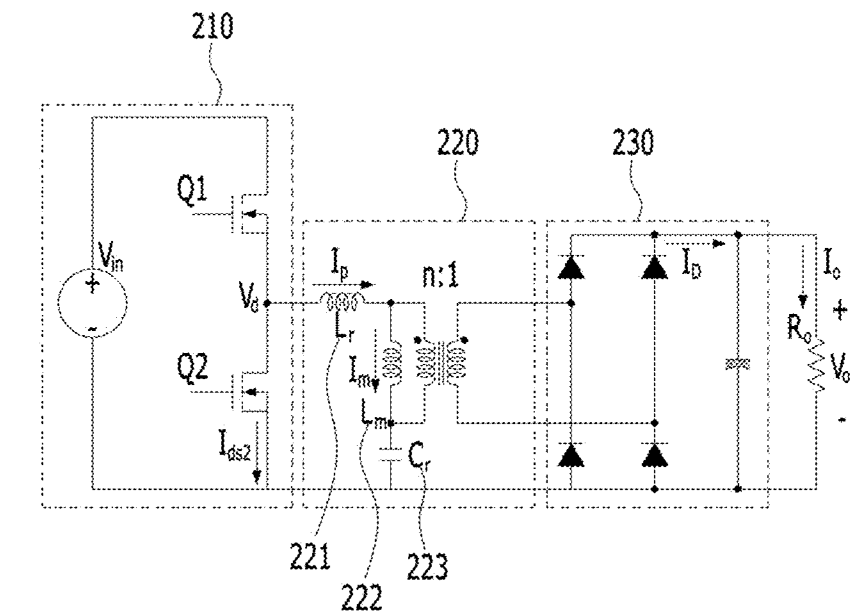
FIG. 6 illustrates an example of the configuration of a circuit of a power supply unit of an electronic product.

FIG. 6 shows an example of the configuration of a circuit of a power supply unit of an electronic product.

Referring to FIG. 6, the configuration of a circuit of a power supply unit (i.e. a PSU) of an electronic product including a square wave generator 210, a resonator 220, and a rectifier 230, for example, a flat panel TV, is illustrated. The flat panel TV generally supports not only a normal mode but also various other operation modes, such as a low-power mode, and is required to implement each operation mode with high efficiency. Therefore, the resonator 220 is implemented in the form of an LLC resonance converter. The LLC resonance converter includes a first inductor (Lr) 221, a second inductor (Lm) 222, and a capacitor (Cr) 223. The inductance (Lm) of the second inductor 222 can be considered to be the inductance that operates the circuit. The resonance frequency varies depending on the operation frequency of the PSU, and the inductance (Lr) of the first inductor 221 and the capacitance (Cr) of the capacitor 223 are factors determining the operation frequency. If the inductance (Lr) of the first inductor 221 and the capacitance (Cr) of the capacitor 223 are not set to appropriate values, the overall efficiency of the circuit may be deteriorated, or the circuit may malfunction.

The inductance (L) value of the leakage-inductance-integrated transformer, such as the transformer 100 according to the embodiment, corresponds to "Lm" in the resonator 220, and the leakage inductance (Lk) value thereof corresponds to "Lr" in the resonator 220.

A ratio (Lk/Lm) required for a PSU of a general flat panel TV is 10 to 20%, but the value of "Lk" of a conventional transformer is too low to meet the ratio requirement.

In more detail, the leakage inductance of the transformer may be obtained using Equation 1 below.

$$L_k=(1-k)*L_m \quad \text{[Equation 1]}$$

In Equation 1, "$L_k$" represents leakage inductance, "k" represents a coupling coefficient, and "$L_m$" represents the inductance of the transformer. Here, the coupling coefficient k may be obtained through experimentation, and, for example, may be obtained using Equation 2 below.

$$k=0.7307-[0.0556*\ln(x)] \quad \text{[Equation 2]}$$

In Equation 2, "x" represents a gap ratio, specifically, the ratio of the spacing distance between the primary coil and the secondary coil to the shortest distance between the outermost periphery of the primary coil and the outer leg portion adjacent thereto, which define a space in which the secondary coil can be wound (hereinafter referred to as a "winding space" for convenience).

In more detail, when both the first bobbin 120 and the second bobbin 130 are present, the shortest distance (i.e. β in FIG. 4) between the primary coil 140 and the secondary coil 150 corresponds to the distance between the outermost periphery of the primary coil 140 and the innermost periphery of the secondary coil 150. Further, if only the first bobbin 120 is present, the maximum allowable value of the distance between the secondary coil 150 and the primary coil 140 in the winding space in which the secondary coil 150 can be present corresponds to the shortest distance (i.e. d1 in FIG. 4) from the outermost periphery of the primary coil 140 to the outer leg portion adjacent thereto.

The leakage inductance of the transformer varies depending on the coupling coefficient, and the coupling coefficient is particularly influenced by the shortest distance between the primary coil 140 and the secondary coil 150 in the core unit 110.

However, the shortest distance β between the primary coil 140 and the secondary coil 150 is determined depending on the position at which the innermost periphery of the secondary coil 150 is located in the winding space. When only the increase in the shortest distance β is of concern, the number of turns of the secondary coil 150 is limited in a confined winding space. Further, because the size of the core unit 110 needs to be increased in order to increase the size of the winding space, there is a limitation on the extent to which the size of the winding space can be increased.

Therefore, in the embodiment, the leakage inductance is secured by controlling a gap ratio, i.e. the ratio of the shortest distance β between the primary coil 140 and the secondary coil 150 to the shortest distance d2 from the outermost periphery of the primary coil 140 to the outer leg portion adjacent thereto.

Figure 7:
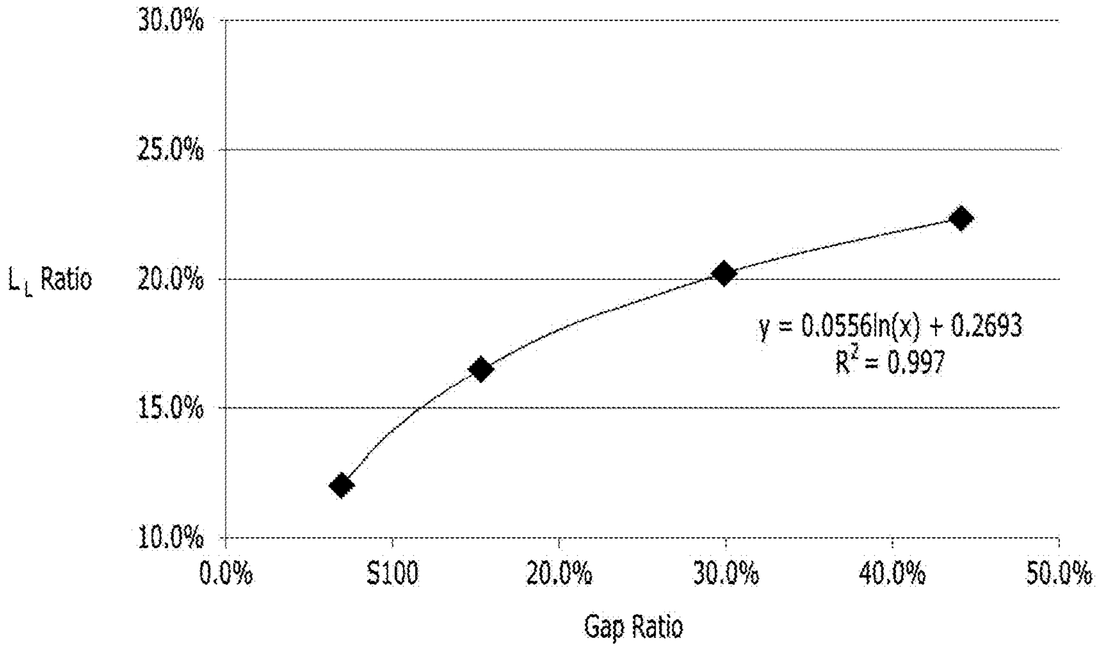
FIG. 7 shows variation in leakage inductance depending on the gap ratio of the transformer according to the embodiment.

FIG. 7 and Table 1 below show the result of experiments measuring variation in leakage inductance depending on the shortest distance β between the primary coil 140 and the secondary coil 150 and the gap ratio. In the experiments, 0.1ψ*40 strands of electric wire having a thickness of 0.75 mm are wound in two layers to embody the primary coil 140, and 0.08ψ*210 strands of conductive wire having a thickness of 1.4 mm are used to embody the secondary coil 150.

TABLE 1

| β[mm] | β/d1 | $L_m$ [μH] | $L_L$ [μH] | $L_L/L_m$ |
|---|---|---|---|---|
| 1.3 | 6.80% | 299 | 35.5 | 11.90% |
| 2.9 | 15.30% | 299 | 50.3 | 16.80% |
| 5.7 | 30.00% | 299 | 59.9 | 20.00% |
| 8.4 | 44.20% | 299 | 67 | 22.40% |

In FIG. 7, the horizontal axis represents a gap ratio, and the vertical axis represents the ratio (LL ratio) of leakage inductance LL to the self-inductance Lm of the transformer 100. Referring to FIG. 7 and Table 1, it can be seen that, as the gap ratio increases, the ratio of the leakage inductance LL to the self-inductance Lm of the transformer 100 increases in the form of a logarithmic function (which can be modeled as follows: y=0.0556 ln(x)+0.2693 with a proximity of 0.997).

However, the shortest distance β between the primary coil 140 and the secondary coil 150 is preferably 0.1 to 0.3 times as long as "d1". If the ratio is less than 0.1, the LLC matching of a circuit board (e.g. a PSU) on which the transformer is mounted may be lost, and thus the operation frequency may rise, which may cause a problem in that control of the board becomes impossible. If the ratio exceeds 0.3, the efficiency of the transformer 100 may be deteriorated, and oscillation may occur on the board. However, this example is given on the assumption that a general PSU is used, and the disclosure is not limited thereto, depending on the type of circuit in which the transformer is mounted.

Consequently, referring to Equations 1 and 2, it can be seen that the leakage inductance is influenced by the coupling coefficient k and that the coupling coefficient is influenced by the distance between the primary coil and the secondary coil and the overlapping area therebetween. In the transformer 100 according to the embodiment, the coupling coefficient is reduced by controlling the spacing distance between the primary coil and the secondary coil in order to increase leakage inductance, and additional leakage inductance is secured by misaligning the receiving space for the primary coil and the receiving space for the secondary coil from each other in the horizontal direction.

Therefore, the transformer according to the embodiment is capable of being slimmed due to the above-described coupling structure of the bobbin units and is capable of securing a high Lk value, and thus is suitable for constitution of a power supply unit of a flat panel TV.

According to the transformer 100 of the embodiment described above, in at least a region in which the bobbin units 120 and 130 are enveloped by the core unit 110, the second receiving portion RP2 is disposed on the first extension portion EP1, and the first receiving portion RP1 is disposed under the second extension portion EP2 due to the coupling structure of the bobbin units 120 and 130, whereby the first receiving portion RP1 and the second receiving portion RP2 do not at least partially overlap each other in the horizontal direction. However, according to another aspect of the embodiment, the space in which the primary coil 140 is received and the space in which the secondary coil 150 is received may be parallel to each other. This will be described with reference to FIG. 8.

Figure 8:
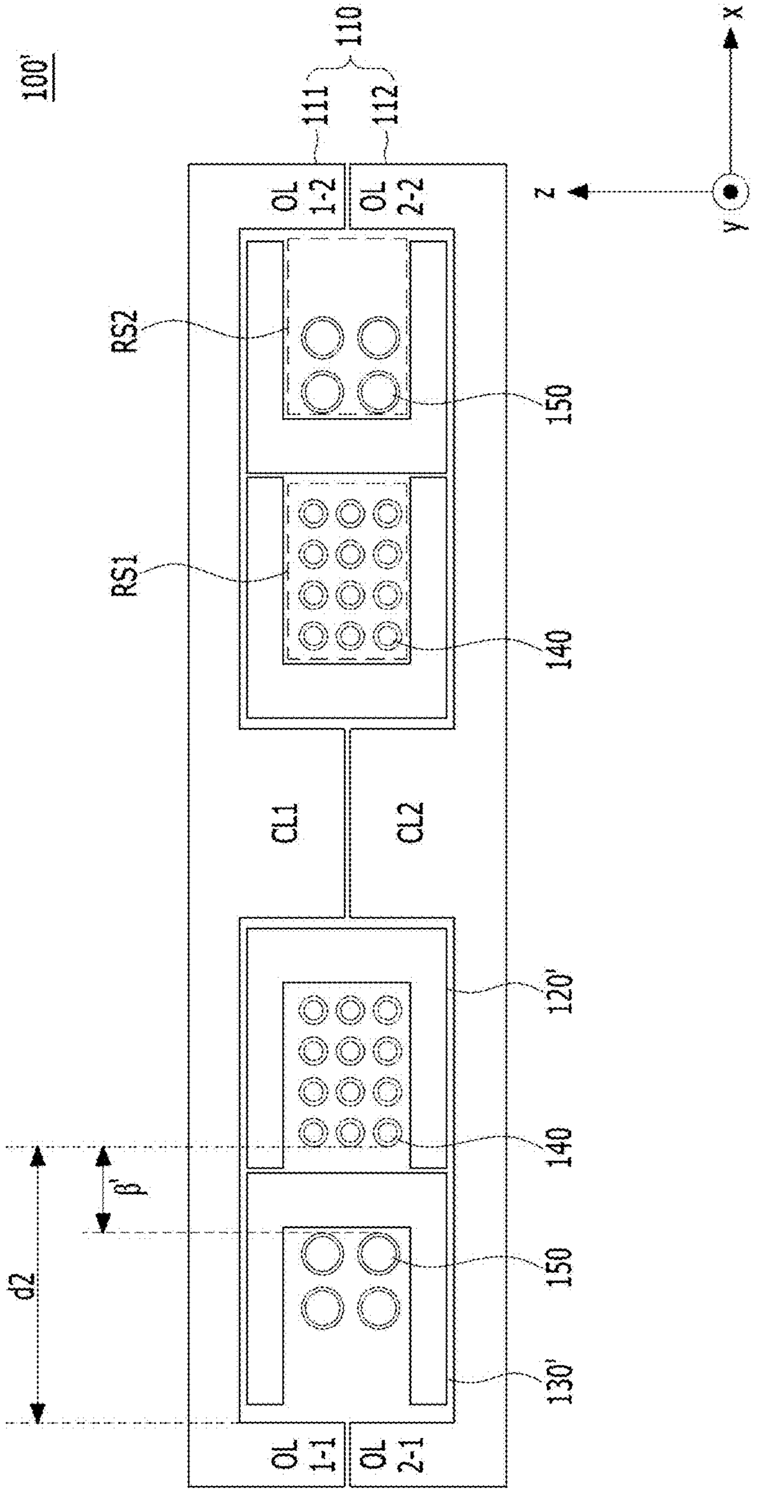
FIG. 8 is a cross-sectional view of a transformer according to another aspect of the embodiment.

FIG. 8 is a cross-sectional view of a transformer according to another aspect of the embodiment.

FIG. 8 illustrates a cross-sectional view of the region of a transformer 100' in which a primary coil 140, a secondary coil 150, a first bobbin 120', and a second bobbin 130' are enveloped by a core unit 110. Illustration of the insulating units 161 and 162 is omitted from FIG. 8 for clear understanding. Of course, however, the transformer 100' according to another aspect may also include the insulating units 161 and 162.

The first bobbin 120' provides a first receiving space RS1 receiving the primary coil 140 therein, and the second bobbin 130' provides a second receiving space RS2 receiving the secondary coil 150 therein.

The second bobbin 130' may be disposed further outwards than the first bobbin 120' between the center leg portions CL1 and CL2 and the first outer leg portions OL1-1 and OL1-2 and between the center leg portions CL1 and CL2 and the second outer leg portions OL2-1 and OL2-2.

In addition, the first receiving space RS1 and the second receiving space RS2 may at least partially overlap each other in the direction from the first outer leg portions OL1-1 and OL1-2 of the core unit 110 toward the second outer leg portions OL2-1 and OL2-2 thereof. In an example, the first receiving space RS1 and the second receiving space RS2 may be parallel to each other, but the disclosure is not limited thereto.

Due to the overlapping of the receiving spaces RS1 and RS2, the primary coil 140 and the secondary coil 150 may also at least partially overlap each other in the direction from the first outer leg portions OL1-1 and OL1-2 toward the second outer leg portions OL2-1 and OL2-2.

Preferably, in the transformer 100' according to the another aspect, a gap ratio, i.e. the ratio (β'/d2) of the shortest distance β' between the primary coil 140 and the secondary coil 150 to the shortest distance d2 from the outermost periphery of the primary coil 140 to the outer leg portion adjacent thereto, may be 0.1 to 0.3.

In addition, similar to the transformer 100 of the above embodiment, in the transformer 100' according to the another aspect, the shortest distance between the primary coil 140 and the secondary coil 150 in the region in which the bobbin units 120' and 130' are not enveloped by the core unit 110 may be the same as or different from the shortest distance β' between the primary coil 140 and the secondary coil 150 in the region in which the bobbin units 120' and 130' are enveloped by the core unit 110. Preferably, a shortest-distance ratio (β/α) may be 1 to 1.3.

Hereinafter, transformers 300 and 300' according to other embodiments will be described in detail with reference to the accompanying drawings.

Figure 9:
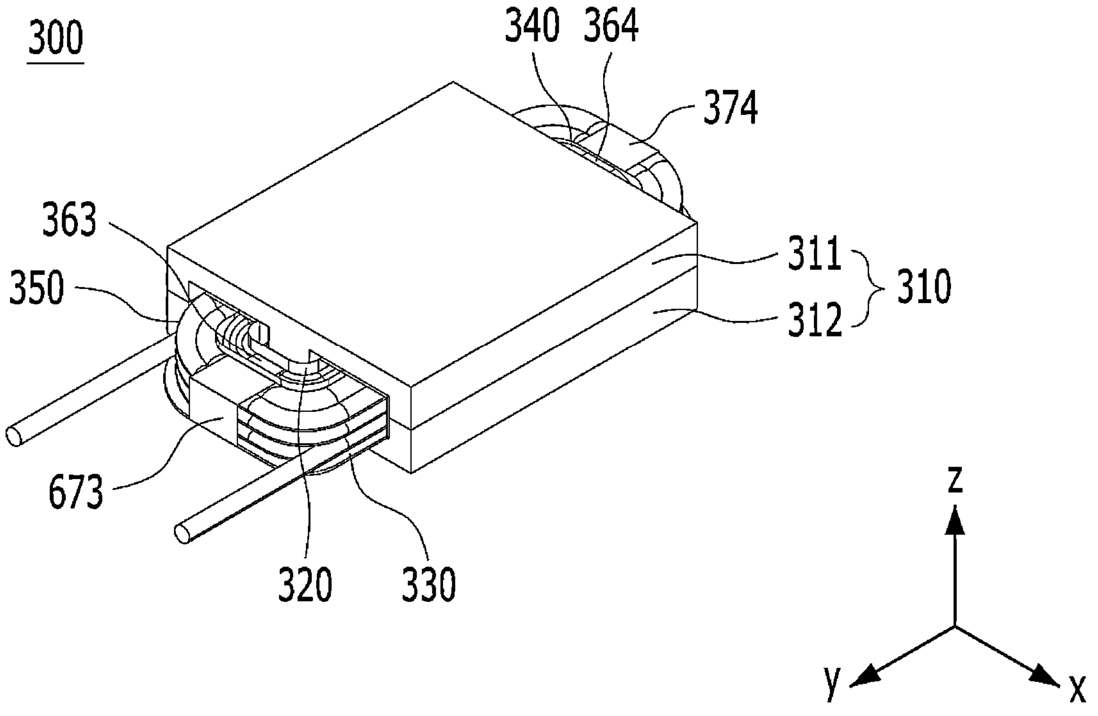
FIG. 9 is a perspective view of a transformer according to another embodiment.
Figure 10:
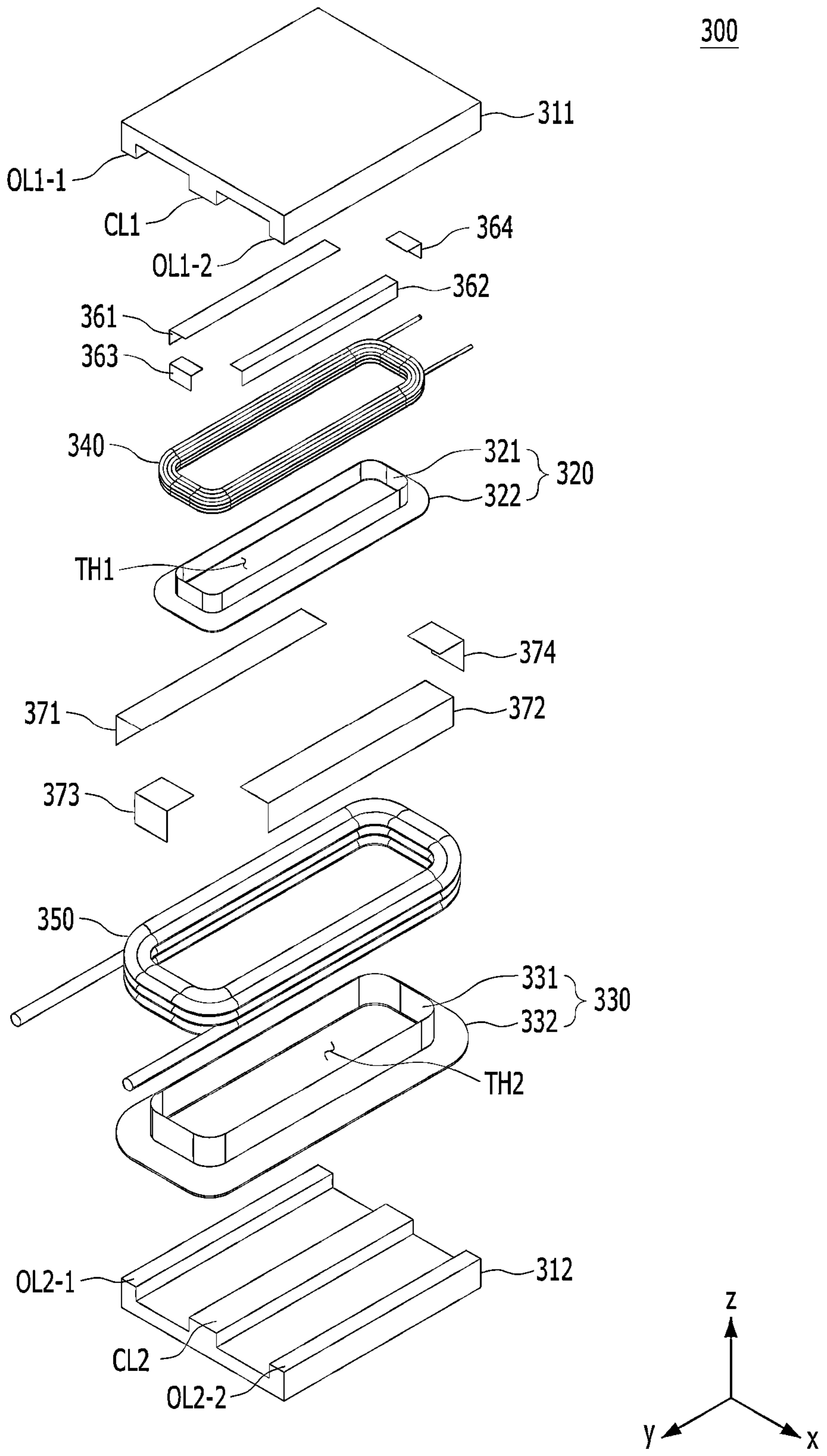
FIG. 10 is an exploded perspective view of the transformer according to the another embodiment.

FIG. 9 is a perspective view of a transformer according to another embodiment, and FIG. 10 is an exploded perspective view of the transformer according to the another embodiment.

Referring to FIGS. 9 and 10 together, a transformer 300 according to the another embodiment may include a core unit 310, bobbin units 320 and 330, a first coil 340, a second coil 350, first coil-fixing units 361, 362, 363, and 364, and second coil-fixing units 371, 372, 373, and 374. Hereinafter, the respective components will be described in detail.

Since the core units 311 and 312 have configurations similar to those of the core units 111 and 112 according to the above-described embodiment, duplicate descriptions thereof will be omitted.

When the upper core 311 and the lower core 312 of the core units 311 and 312 according to the another embodiment are coupled to each other in the vertical direction, a first receiving space may be disposed between the first outer leg portions and the center leg portions, and a second receiving space may be disposed between the second outer leg portions and the center leg portions.

The bobbin units 320 and 330 may include a first bobbin 320 and a second bobbin 330.

The first bobbin 320 and the second bobbin 330 may respectively have a first through-hole TH1 and a second through-hole TH2 formed therein, and may be aligned such that the center leg portions CL1 and CL2 of the core unit 310 pass through the first through-hole TH1 and such that the first bobbin 120 is received in the second through-hole TH2.

Each of the first bobbin 320 and the second bobbin 330 may have a long axis, which extends in the direction in which each of the center leg portions and the outer leg portions extends in a plane (i.e. the Y-axis direction), and a short axis, which extends in the direction in which the center leg portions and the outer leg portions are spaced apart from each other in a plane (i.e. the X-axis direction).

The first bobbin 320 may include a first side wall 321 and a first plate 322 disposed on the lower end of the first side wall 321.

The first side wall 321 may take the form of a quadrangular-shaped flat plate having rounded corners, and the first plate 322 may take the form of a quadrangular-shaped ring-type flat plate having rounded corners. However, the disclosure is not limited thereto.

The first side wall 321 may electrically isolate the center leg portions CL1 and CL2 and the first coil 340 from each other. In addition, the inner circumferential surface of the first side wall 321 may define the first through-hole TH1, and the first coil 340 may be wound on the outer circumferential surface of the first side wall 321.

The first plate 322 may electrically isolate the lower core 322 and the first coil 340 from each other, and may support the first coil 340 upwards.

The second bobbin 330 may include a second side wall 131 and a second plate 132 disposed on the lower end of the second side wall 131.

The second side wall 331 may take the form of a quadrangular-shaped flat plate having rounded corners, and the second plate 332 may take the form of a quadrangular-shaped ring-type flat plate having rounded corners. However, the disclosure is not limited thereto.

The second side wall 331 may electrically isolate the first coil 340 and the second coil 350 from each other. In addition, the inner circumferential surface of the second side wall 331 may define the second through-hole TH2, and the second coil 350 may be wound on the outer circumferential surface of the second side wall 331.

The second plate 332 may electrically isolate the lower core 322 and the second coil 350 from each other, and may support the second coil 350 upwards.

Each of the first coil 340 and the second coil 350 may be a multiple-turn winding in which a rigid metallic conductor, for example a copper conductive wire, is wound multiple times, but the disclosure is not limited thereto. In addition, the thickness of the conductive wire constituting the second coil 350 may be 50% to 150% of the thickness of the conductive wire constituting the first coil 340, but the disclosure is not limited thereto. In addition, in the transformer 300 according to the embodiment, the first coil 340 may correspond to the primary coil, and the second coil 150 may correspond to the secondary coil, but the disclosure is not limited thereto. Furthermore, the two ends of the conductive wire constituting the first coil 340 and the two ends of the conductive wire constituting the second coil 350 may be led out in opposite directions. However, these lead-out directions are merely exemplary, and the disclosure is not limited thereto.

Meanwhile, the coil-fixing units 361, 362, 363, 364, 371, 372, 373, and 374 may be disposed on at least parts of the upper portions and the outer circumferential surfaces of the first coil 140 and the second coil 350. The coil-fixing units 361, 362, 363, 364, 371, 372, 373, and 374 may include an insulative and flexible material. For example, each coil-fixing unit may include a sheet of insulating tape including Kapton, ketone, polyimide, or the like. In another example, each coil-fixing unit may be formed through molding of polymer such as epoxy or bonding of an adhesive. However, the disclosure is not limited thereto, so long as the coil-fixing units are capable of fixing the first coil 340 and the second coil 350 and at least electrically isolating the same from the core unit 310.

The coil-fixing units may include the first coil-fixing units 361, 362, 363, and 364, and the second coil-fixing units 371, 372, 373, and 374.

The first coil-fixing units 361, 362, 363, and 364 may be disposed on at least parts of the upper surface and the outer circumferential surface (or the upper portion and the outer side portion) of the first coil 340 to fix and electrically isolate the first coil 340.

In addition, the second coil-fixing units 371, 372, 373, and 374 may be disposed on at least parts of the upper surface and the outer circumferential surface (or the upper portion and the outer side portion) of the second coil 350 to fix and electrically isolate the second coil 350.

Figure 11:
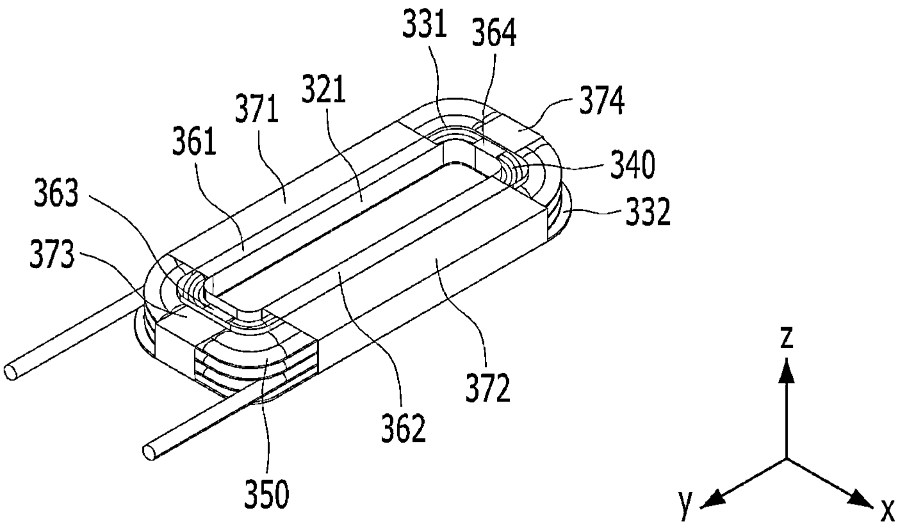
FIG. 11 is a perspective view of the transformer according to the another embodiment, with a core removed therefrom.

Hereinafter, the coil-fixing units will be described in more detail with reference to FIGS. 11 to 13. FIG. 11 is a perspective view of the transformer according to the another embodiment, with the core removed therefrom.

Referring to FIG. 11, the first coil-fixing units 361, 362, 363, and 364 may include a 1-1$^{st}$ coil-fixing unit 361 and a 1-2$^{nd}$ coil-fixing unit 362, which extend in the long-axis direction of the first bobbin 320 (i.e. the Y-axis direction) and face each other, and may include a 1-3$^{rd}$ coil-fixing unit 363 and a 1-4$^{th}$ coil-fixing unit 364, which extend in the short-axis direction of the first bobbin 320 (i.e. the X-axis direction) and face each other.

In addition, the second coil-fixing units 371, 372, 373, and 374 may include a 2-1$^{st}$ coil-fixing unit 371 and a 2-2$^{nd}$ coil-fixing unit 372, which extend in the long-axis direction of the second bobbin 330 (i.e. the Y-axis direction) and face each other, and may include a 2-3$^{rd}$ coil-fixing unit 373 and a 2-4$^{th}$ coil-fixing unit 374, which extend in the short-axis direction of the second bobbin 330 (i.e. the X-axis direction) and face each other.

Figure 12:
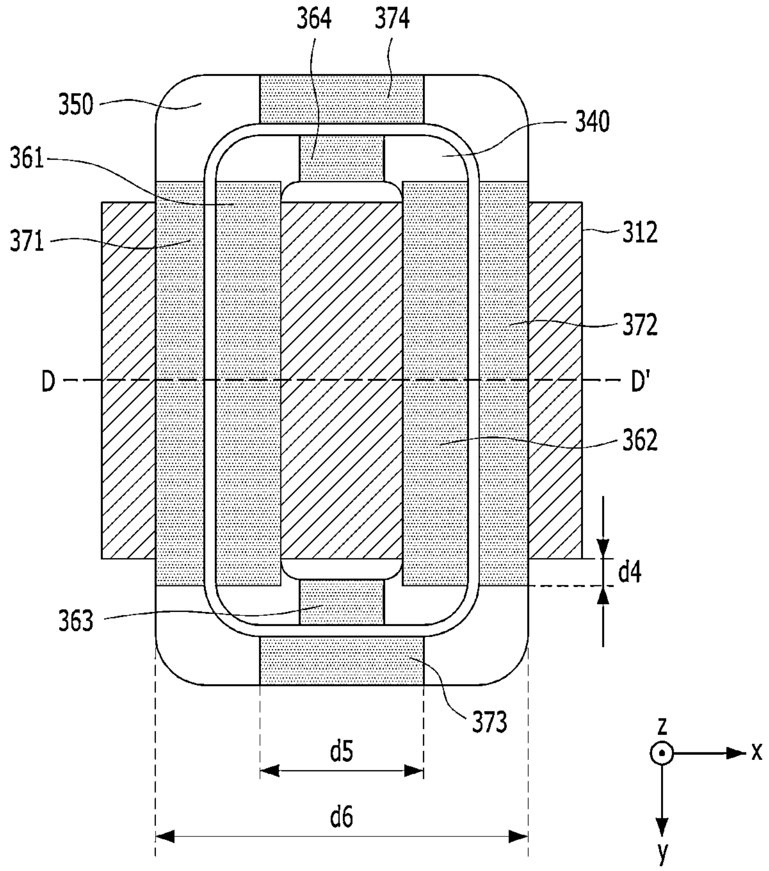
FIG. 12 is a plan view of the transformer according to the another embodiment.
Figure 13:
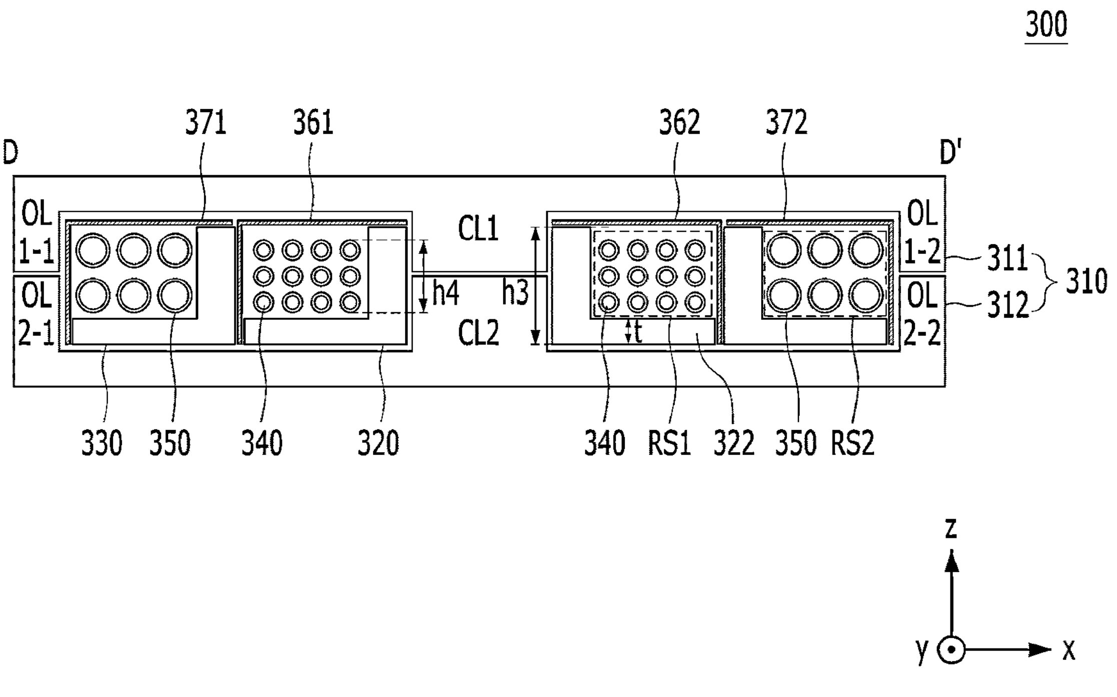
FIG. 13 is a cross-sectional view of the transformer according to the another embodiment, taken along line D-D' in FIG. 12.

FIG. 12 is a plan view of the transformer according to the another embodiment, and FIG. 13 is a cross-sectional view of the transformer according to the another embodiment, taken along line D-D' in FIG. 12.

For better understanding, the plan view in FIG. 12 illustrates the transformer 300 according to the another embodiment, with the upper core 311 removed therefrom. Referring to FIG. 12, in order to ensure electrical insulation from the core unit 310, it is preferable for each of the 1-1$^{st}$ coil-fixing unit 361, the 2-1$^{st}$ coil-fixing unit 371, the 1-2$^{nd}$ coil-fixing unit 362, and the 2-2$^{nd}$ coil-fixing unit 372 to further extend from the core unit 310 by a predetermined length d4 in the extension direction thereof (i.e. the Y-axis direction). For example, "d4" may be 1 mm to 10 mm, but the disclosure is not limited thereto.

Meanwhile, the length of each of the coil-fixing units 363, 364, 373, and 374 in the extension direction thereof (i.e. the X-axis direction), which extend in the short-axis direction of the first bobbin 320 and the second bobbin 330 (i.e. the X-axis direction), may be determined depending on the width of the coil corresponding thereto. For example, the length d5 of the 2-3$^{rd}$ coil-fixing unit 373 in the extension direction thereof may be ⅕ to ⅓ of the width d6 of the second coil 150 in the same direction. When the ratio (d5/d6) is less than ⅕, the coil is not securely fixed, and when the ratio (d5/d6) exceeds ⅓, the coil-fixing unit covers a relatively large area of the coil, thus deteriorating heat dissipation efficiency. However, it will be apparent to those skilled in the art that the above ratio is merely exemplary and can be changed within a range ensuring superior heat dissipation and fixing capability.

The number of coil-fixing units and the arrangement thereof described above with reference to FIGS. 11 and 12 are merely exemplary, and the disclosure is not limited thereto. For example, although each of the 1-3$^{rd}$ coil-fixing unit 363, the 2-3$^{rd}$ coil-fixing unit 373, the 1-4$^{th}$ coil-fixing unit 364, and the 2-4$^{th}$ coil-fixing unit 374 is disposed at the center of a corresponding one of the first bobbin 320 and the second bobbin 330 in the short-axis direction thereof, at least one of the coil-fixing units 363, 364, 373, and 374 may be divided into two or more sections disposed so as to be spaced apart from each other in the short-axis direction.

However, in order to electrically isolate the first coil 340 and the second coil 350 from the core unit 110, it is preferable that the coil-fixing units be disposed on the portions of the first coil 340 and the second coil 350 that overlap the core unit 310 in the vertical direction. This will be described with reference to FIG. 13.

Referring to FIG. 13, it is preferable to include the 1-1$^{st}$ coil-fixing unit 361 and the 2-1$^{st}$ coil-fixing unit 371, which are disposed in the first receiving space between the first outer leg positions OL1-1 and OL2-1 and the center leg portions CL1 and CL2, and the 1-2$^{nd}$ coil-fixing unit 362 and the 2-2$^{nd}$ coil-fixing unit 372, which are disposed in the second receiving space between the second outer leg positions OL1-2 and OL2-2 and the center leg portions CL1 and CL2.

Meanwhile, the thickness of each of the coil-fixing units 361, 362, 363, 364, 371, 372, 373, and 374 may be 90% or less of the thickness t of the first plate 322 or the second plate 332. In addition, the height h3 of the bobbin units 320 and 330 may be equal to or 140% or less of the height h4 of the primary coil 340 or the secondary coil 350. For example, when the height h4 of the coil 340 or 350 is 1.8 cm, the height of the bobbin may be 1.8 to 2.52 cm.

Figure 14:
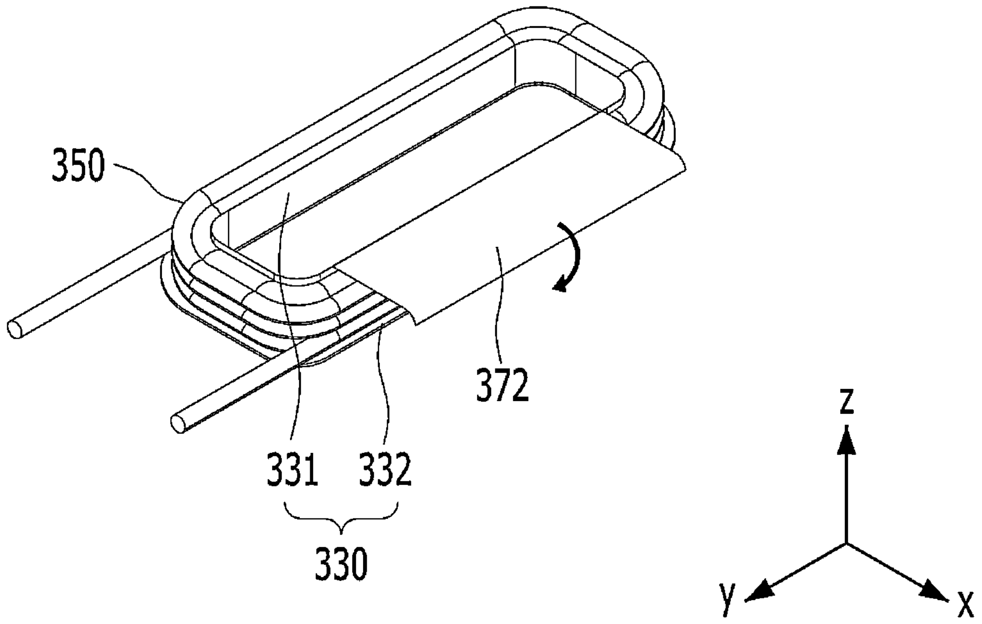
FIG. 14 illustrates an example of a process of assembling the transformer according to the another embodiment.

FIG. 14 illustrates an example of a process of assembling the transformer according to the another embodiment.

FIG. 14 illustrates the process in which the 2-2$^{nd}$ coil-fixing unit 372 is disposed. Specifically, the 2-2$^{nd}$ coil-fixing unit 372 may be sequentially attached to the upper surface of the second side wall 331 of the second bobbin 130, the upper surface and the outer circumferential surface of the second coil 350, and the side surface of the second plate 331 so as to surround the same. The attachment order may be different from the order shown in FIG. 14. In order to ensure more superior fixing and electrical isolation capability, the 2-2$^{nd}$ coil-fixing unit 372 may extend from the upper surface of the second side wall 331 to at least a portion of the inner circumferential surface of the second side wall, or may extend from the side surface of the second plate 332 to at least a portion of the lower surface thereof.

According to another aspect of the another embodiment, one coil-fixing unit may fix and electrically isolate both the first coil 340 and the second coil 350. This will be described with reference to FIGS. 15 and 16.

Figure 15:
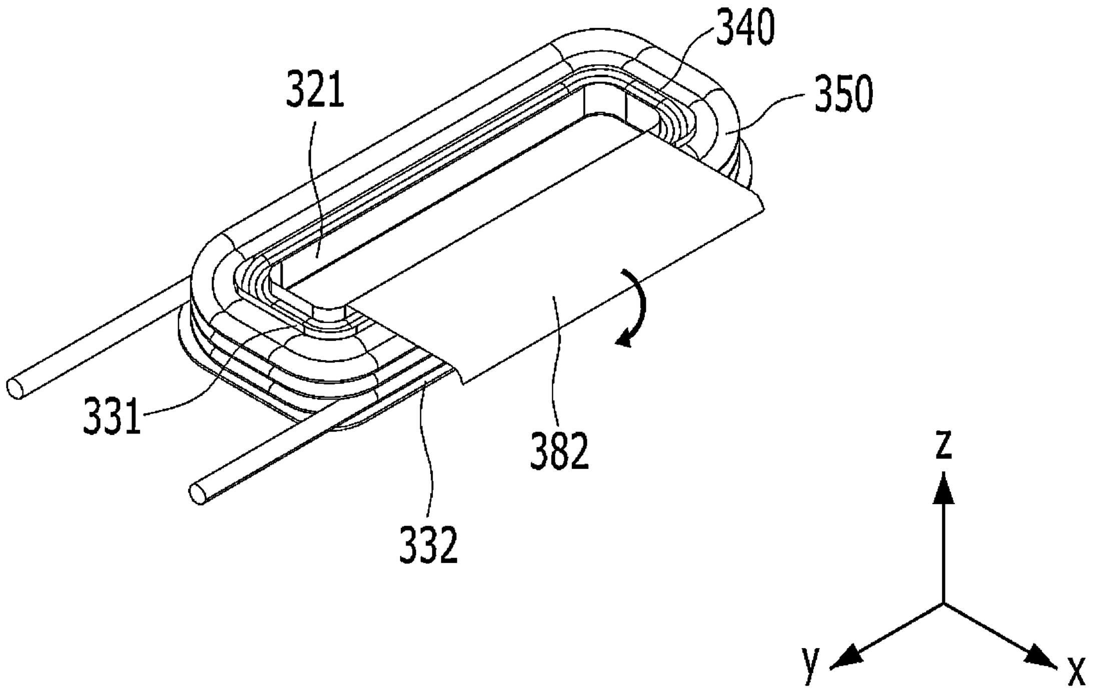
FIG. 15 illustrates an example of a process of assembling a transformer according to another aspect of the another embodiment.
Figure 16:
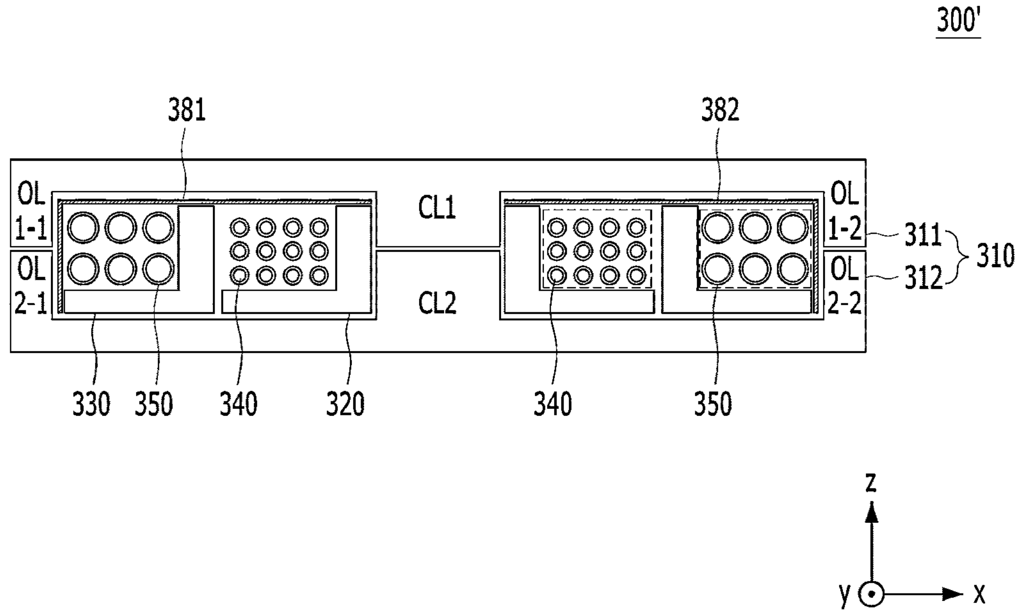
FIG. 16 is a cross-sectional view of the transformer according to the another aspect of the another embodiment.

FIG. 15 illustrates an example of a process of assembling a transformer according to another aspect of the another embodiment, and FIG. 16 is a cross-sectional view of the transformer 300' according to the another aspect of the another embodiment.

Referring to FIGS. 15 and 16 together, in the state in which the bobbin units 320 and 330, the first coil 340, and the second coil 350 are assembled, one coil-fixing unit 382 may be sequentially attached to the upper surface of the first side wall 321 of the second bobbin 330, the upper surface of the first coil 340, the upper surface of the second side wall 331, the upper surface of the second coil 350, the outer circumferential surface of the second coil 350, and the side surface of the second plate 331 so as to surround the same. The attachment order may be different from the order shown in FIG. 15. In order to ensure more superior fixing and electrical isolation capability, the coil-fixing unit 382 may extend from the upper surface of the first side wall 131 to at least a portion of the inner circumferential surface of the first side wall, or may extend from the side surface of the second plate 332 to at least a portion of the lower surface thereof.

The configuration in which one coil-fixing unit fixes both the first coil 340 and the second coil 350 as shown in FIG. 15 may also be applied to the position (i.e. the position corresponding to 361 and 371) that faces the illustrated coil-fixing unit 382 in the short-axis direction of the bobbin units 320 and 330 and to the positions of the two long-axis ends (i.e. the position corresponding to 363 and 373 and the position corresponding to 364 and 374) that face the illustrated coil-fixing unit 382 in the long-axis direction of the bobbin units 320 and 330. For example, as shown in FIG. 16, one coil-fixing unit 381 is disposed at the position (i.e. the position corresponding to 361 and 371) that faces the coil-fixing unit 382 shown in FIG. 15 in the short-axis direction of the bobbin units 320 and 330.

Hereinafter, the effects of the transformers 300 and 300' according to the other embodiments will be described through comparison with a transformer 300" according to a comparative example with reference to FIGS. 17 and 18.

Figure 17:
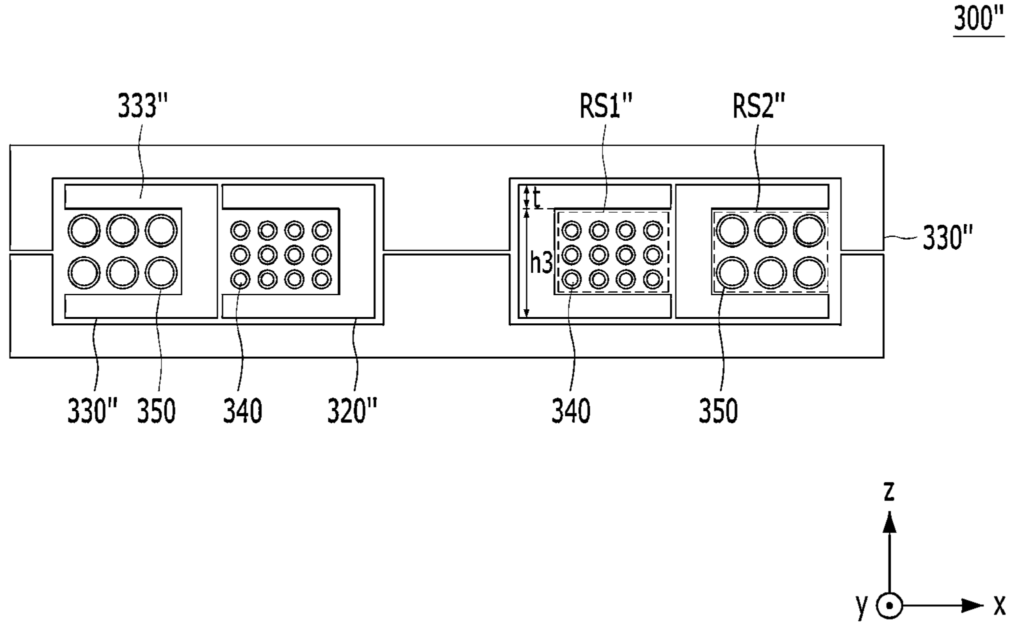
FIG. 17 is a cross-sectional view of a transformer according to a comparative example.

FIG. 17 is a cross-sectional view of a transformer according to a comparative example.

Referring to FIG. 17, the transformers 300 and 300' according to the other embodiments are configured such that the upper surfaces of at least portions of the first coil 340 and the second coil 350 are fixed and electrically isolated by the coil-fixing units 361, 362, 363, 364, 371, 372, 373, 374, 381, and 382, whereas the transformer 300" according to the comparative example is configured such that an upper plate 333" is disposed on bobbin units 320" and 330" to fix and electrically isolate a first coil 340 and a second coil 350.

In this case, assuming that the first coil 340 and the second coil 350 of the transformer 300" according to the comparative example have the same configuration as those of the transformer 300 according to the another embodiment and thus the transformer 300" according to the comparative example has therein the same receiving spaces as the transformer 300 according to the another embodiment, the transformer 300" according to the comparative example needs to increase in size.

For example, it is assumed that the space RS1 in which the first coil 340 is received and the space RS2 in which the second coil 350 is received, which are shown in FIG. 13, respectively have the same sizes as a space RS1" in which the first coil 340 is received and a space RS2" in which the second coil 350 is received, which are shown in FIG. 17, and that the thickness of the upper plate 333" is the same as the thickness t of each of the first plate 322 and the second plate 332. In this case, in the transformer 300 according to the another embodiment, the minimum height of the receiving space in the core unit 310 required to secure the receiving spaces RS1 and RS2 having given sizes corresponds to the sum of the height h3 of the bobbin units 320 and 330 in the vertical direction and the thickness of the coil-fixing unit. On the other hand, in the transformer 300" according to the comparative example, the minimum height of the receiving space in the core unit 310" required to secure the receiving spaces RS1" and RS" having given sizes corresponds to "h3+t".

In other words, the required height of the receiving space in the core unit 310 of the transformer 300 according to the another embodiment is lower than the required height of the receiving space in the core unit 310" of the transformer 300" according to the comparative example by "t—thickness of core-fixing unit". As described above, since the thickness of the core-fixing unit is 90% or less of "t", the transformer 300 according to the another embodiment may have a height that is reduced by 0.1t or greater compared to the comparative example, and accordingly, may be further slimmed.

In addition, in the comparative example, the upper plate (e.g. 333") of each bobbin unit 320" or 330" is integrally formed with and made of the same material as the remainder of the bobbin unit, such as rigid polymer resin. Therefore, it is difficult for the receiving spaces RS1" and RS2" for the first coil 340 and the second coil 150 to flexibly change in size, and thus the sizes of the first coil 340 and the second coil 350 are strictly restricted depending on the sizes of the bobbin units 320" and 330".

In contrast, in the transformer 300 according to the another embodiment, since the coil-fixing units are flexible, winding and fixation of the first coil 340 and the second coil 350 are possible even if there is a slight variation in the size of the first coil 340 and the second coil 350.

Further, when current flows through the first coil 340 and the second coil 350, heat is generated therefrom, and the resistance thereof increases. In the transformer 300" according to the comparative example, the entireties of the upper surfaces of the first coil 340 and the second coil 350 are covered by the upper plate (e.g. 333") of each of the bobbin units 320" and 330", and thus heat dissipation is degraded. Degradation of heat dissipation increases the amount of heat that is generated. The increase in the amount of heat that is generated leads to an increase in the resistance of the coil. The increase in resistance causes an increase in loss, resulting in deterioration in efficiency.

In contrast, in the transformers 300 and 300' according to the other embodiments, since the coil-fixing units are flexible and do not cover the entireties of the upper surfaces of the first coil 340 and the second coil 350, a heat transfer path (or a heating path) in the receiving space in the core unit 310 increases in length, and thus heat dissipation is improved.

The effects obtainable through excellent heat dissipation efficiency will be described with reference to FIG. 18 and Table 2.

Figure 18:
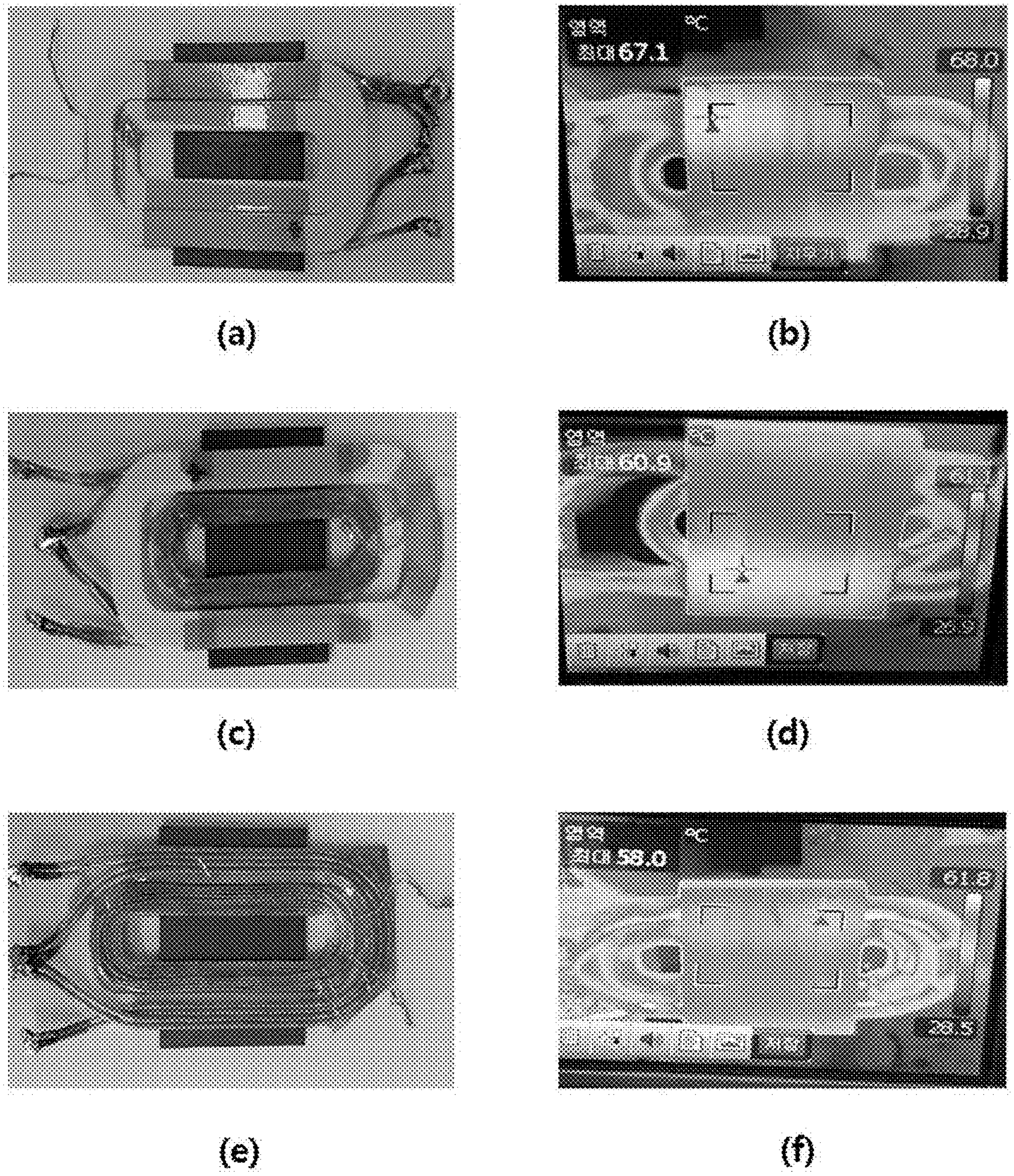
FIG. 18 (*a*) to (*f*) shows the results of tests measuring the amount of heat that is generated from the transformer according to the another embodiment and the comparative example.

FIG. 18 shows the results of tests measuring the amount of heat that is generated from the transformer according to the another embodiment and the comparative example. Although the upper core 311 is not depicted in FIGS. 18(*a*), 18(*c*), and 18(*e*) for better understanding, it is to be noted that the tests were performed in the state in which the upper core 311 was attached.

FIG. 18(*a*) shows the transformer 300" according to the comparative example, and FIG. 18(*b*) shows a thermal image of the transformer shown in FIG. 18(*a*). In addition, FIG. 18(*c*) shows a modification of the transformer according to the comparative example in which only the upper plate of the first bobbin 320" is substituted with a core-fixing unit, and FIG. 18(*d*) shows a thermal image of the transformer shown in FIG. 18(*c*). In addition, FIG. 18(*e*) shows the transformer 300 according to the another embodiment, and FIG. 18(*f*) shows a thermal image of the transformer 300 according to the another embodiment.

The results of the tests performed on the respective cases shown in FIG. 18 are shown in Table 2 below.

TABLE 2

| Sample No. | Comparative Example | Modification of Comparative Example | Another Embodiment |
|---|---|---|---|
| Core Size(mm) | 60 × 50 | 60 × 50 | 60 × 50 |
| Inductance(μH) | 298.6 | 311.9 | 323.2 |
| Leakage Inductance | 41.8 | 48.28 | 40 |
| Q (Quality Factor) | 119 | 122 | 140 |
| Upper Surface of Core Unit | 67.1 | 60.9 | 58 |
| Side Surface of Core Unit | 69 | 62 | 61.2 |
| First Coil | 61.9 | 60.9 | 58.3 |

Referring to FIG. 18 and Table 2 together, it can be seen that both the temperature of the core unit and the temperature of the first coil are reduced under the same operating conditions from the comparative example to the another embodiment. In addition, it can be seen that loss is reduced due to the reduction in temperature, and consequently, the Q factor is increased.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

The invention claimed is:

1. A transformer comprising:

a core unit comprising an upper core and a lower core;

a coil unit partially disposed in the core unit; and a bobbin unit disposed between the core unit and the coil unit, wherein the coil unit comprises a first coil and a second coil, the second coil being at least partially disposed beside the first coil, wherein the core unit comprises a first outer leg portion, a second outer leg portion, and a center leg portion disposed between the first outer leg portion and the second outer leg portion, and wherein a shortest distance between the first coil and the second coil is 0.1 times to 0.3 times as long as a shortest distance from an outermost periphery of the first coil to one outer leg portion adjacent thereto, among the first outer leg portion and the second outer leg portion.

2. The transformer according to claim 1, wherein the bobbin unit comprises:

a first bobbin having a first receiving portion formed therein to receive the first coil; and a second bobbin having a second receiving portion formed therein to receive the second coil.

3. The transformer according to claim 1, wherein the bobbin unit comprises:

a first bobbin having a first receiving portion formed therein to receive the first coil; and a second bobbin having a second receiving portion formed therein to receive the second coil, wherein the first bobbin comprises a first extension portion extending from the first receiving portion toward the second bobbin, and wherein the second receiving portion is disposed on the first extension portion.

4. The transformer according to claim 3, wherein a shortest distance between a lower surface of the lower core and the first coil and a shortest distance between the lower surface of the lower core and the second coil are different from each other.

5. The transformer according to claim 3, wherein a shortest distance between a lower surface of the lower core and the first coil is shorter than a shortest distance between the lower surface of the lower core and the second coil.

6. The transformer according to claim 4, wherein the second bobbin comprises a second extension portion extending from the second receiving portion toward the first bobbin, and wherein the first receiving portion is disposed under the second extension portion.

7. The transformer according to claim 4, wherein a part of the second receiving portion is disposed between the first coil and the second coil.

8. The transformer according to claim 1, wherein the core unit further comprises:

a first space formed between the first outer leg portion and the center leg portion to receive a portion of the bobbin unit; and a second space formed between the second outer leg portion and the center leg portion to receive another portion of the bobbin unit.

9. The transformer according to claim 8, wherein a ratio of a second distance, the second distance being a shortest distance between the first coil and the second coil in the first space or the second space, to a first distance, the first distance being a shortest distance between the first coil and the second coil outside the first space and the second space, is 1 to 1.3.

10. The transformer according to claim 4, wherein the shortest distance between the lower surface of the lower core and the first coil is 0.3 to 0.7 times as long as the shortest distance between the lower surface of the lower core and the second coil.

11. The transformer according to claim 3, wherein the first bobbin includes a coil lead-out portion disposed on the upper surface thereof, and the second bobbin includes a through-hole, wherein the coil lead-out part is disposed of in the through-hole.

12. The transformer according to claim 3, wherein the first bobbin comprises:

a first top portion;

a first bottom portion disposed below the top portion; and a first middle portion disposed between the top portion and the bottom portion, and wherein the first extension portion is disposed on the bottom portion.

13. The transformer according to claim 12, wherein the second bobbin comprises:

a second top portion;

a second bottom portion disposed below the top portion; and a second middle portion disposed between the second top portion and the second bottom portion, and wherein the first bobbin is at least partially received in a recess defined by a lower surface of the second top portion and an inner side surface of the second middle portion.

14. The transformer according to claim 12, wherein the first receiving portion formed therein to receive the first coil in a space defined by a lower surface of the first top portion, an outer surface of the first middle portion, and a portion of an upper surface of the first bottom portion.

15. The transformer according to claim 13, wherein the second receiving portion formed therein to receive the second coil in a space defined by a portion of a lower surface of the second top portion, an outer side surface of the second middle portion, and a portion of an upper surface of the second bottom portion.

16. The transformer according to claim 13, wherein the second bobbin further includes a board support portion, which is spaced apart from each other in the long-axis direction of the second bottom portion.

17. The transformer according to claim 13, wherein the second bobbin further includes a terminal unit disposed on respective ends of the second top portion in the long-axis direction thereof.

18. The transformer according to claim 17, wherein the terminal unit includes a first terminal unit and a second terminal unit, the first terminal unit includes a plurality of pins, which are spaced apart from each other, and any one of the two ends of the conductive wire constituting the first coil is conductively connected to at least one of the plurality of pins, the second terminal unit includes a plurality of pins, which are spaced apart from each other, and any one of the two ends of the conductive wire constituting the second coil is conductively connected to at least one of the plurality of pins.

* * * * *